(12) United States Patent
Berkowitz et al.

(10) Patent No.: US 7,516,165 B2
(45) Date of Patent: Apr. 7, 2009

(54) DYNAMIC SYNCHRONIZATION OF TABLES

(75) Inventors: Brian T. Berkowitz, Seattle, WA (US); Peter A. Christofferson, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 460 days.

(21) Appl. No.: 10/975,932

(22) Filed: Oct. 27, 2004

(65) Prior Publication Data
US 2005/0091240 A1 Apr. 28, 2005

Related U.S. Application Data

(60) Continuation of application No. 10/336,174, filed on Jan. 2, 2003, now Pat. No. 6,934,727, which is a division of application No. 09/342,852, filed on Jun. 29, 1999, now Pat. No. 6,529,921.

(51) Int. Cl.
*G06F 17/30* (2006.01)
(52) U.S. Cl. .............. 707/201; 707/200; 707/202; 707/203; 707/204; 715/201
(58) Field of Classification Search ............ 707/200, 707/201, 203; 715/500.1; 709/231; 370/464
See application file for complete search history.

(56) References Cited

U.S. PATENT DOCUMENTS

| | | | |
|---|---|---|---|
| 4,914,569 A | 4/1990 | Levine et al. | |
| 5,544,347 A | 8/1996 | Yanai et al. | |
| 5,745,904 A | 4/1998 | King et al. | |
| 5,781,910 A | 7/1998 | Gostanian et al. | |
| 5,806,075 A | 9/1998 | Jain et al. | |
| 5,832,508 A | 11/1998 | Sherman | |
| 5,835,766 A | 11/1998 | Iba et al. | |

(Continued)

OTHER PUBLICATIONS

Leverenz et al., "Oracle 8i Concepts," Feb. 1999, Oracle Corporation, 22 pages, <http://www.csee.umbc.edu/help/oracle8/server.815/a67781/toc.htm>.

(Continued)

*Primary Examiner*—Cam-Linh Nguyen
(74) *Attorney, Agent, or Firm*—Klarquist Sparkman, LLP

(57) ABSTRACT

Each node in a network accessing a common database caches a copy of the database tables it uses and updates those tables based on changes made by other nodes in a coherent cache, i.e., those node that also have a copy of the tables in their cache. When a new node joins the coherent cache, dynamic synchronization of the table is performed by having one of the existing nodes act as a source to populate the table(s) required on the new (destination) node from its own copy. The dynamic synchronization controls the population operation and allows for the populating of tables on the destination node from partially populated tables on the source node. The dynamic synchronization of the tables permits database updates to continue to be made to the tables by the existing nodes in the coherent cache and provides a mechanism to propagate the committed updates to the tables on the destination node. Once the tables on the destination node are fully populated, all pending updates are suspended while a snapshot of the state of the table on the source node is taken. Once the destination node has processed the snapshot, active transactions on the source node are initiated on the destination node, and all transactions are allowed to modify the table on the destination node.

12 Claims, 25 Drawing Sheets

U.S. PATENT DOCUMENTS

| | | | |
|---|---|---|---|
| 5,870,765 A * | 2/1999 | Bauer et al. | 707/203 |
| 5,878,410 A | 3/1999 | Zbikowski et al. | |
| 5,966,706 A | 10/1999 | Biliris et al. | |
| 5,991,771 A | 11/1999 | Falls et al. | |
| 6,014,669 A * | 1/2000 | Slaughter et al. | 707/10 |
| 6,029,177 A | 2/2000 | Sadiq et al. | |
| 6,032,158 A | 2/2000 | Mukhopadhyay et al. | |
| 6,052,695 A | 4/2000 | Abe et al. | |
| 6,122,630 A | 9/2000 | Strickler et al. | |
| 6,151,602 A | 11/2000 | Hejlsberg et al. | |
| 6,157,991 A | 12/2000 | Arnon | |
| 6,208,990 B1 | 3/2001 | Suresh et al. | |
| 6,247,038 B1 | 6/2001 | Banks et al. | |
| 6,529,921 B1 | 3/2003 | Berkowitz et al. | |
| 6,535,892 B1 | 3/2003 | LaRue et al. | |
| 7,143,177 B1 * | 11/2006 | Johnson et al. | 709/231 |
| 7,165,213 B1 * | 1/2007 | Busey | 715/500.1 |

OTHER PUBLICATIONS

"TimesTen 3.7-In—Memory Database for 32-bit and 64-bit Operating Systems," TimesTen Performance Software, http://www.timesten.com/products/ttdatasheet.html, p. 11 (Jun. 1999).

"TimeTen In—Memory Data Management—Technical White Paper," Technical White Paper, TimesTen Performance Software, http://www.timesten.com/products/wp.html, p. 15 (2000).

* cited by examiner

DYNAMIC SYNCHRONIZATION OF TABLES

CROSS-REFERENCE TO RELATED APPLICATION

This is a continuation of U.S. application Ser. No. 10/336,174, filed Jan. 2, 2003, which is a divisional of U.S. application Ser. No. 09/342,852, now U.S. Pat. No. 6,529,921, filed Jun. 29, 1999. Both applications are hereby incorporated by reference.

FIELD OF THE INVENTION

This invention relates generally to database systems, and more particularly to dynamically synchronizing database tables among multiple networked computers

RELATED APPLICATIONS

The present patent application is related to U.S. Pat. No. 6,457,021 titled "In-Memory Database System" which issued on Sep. 24,2002, U.S. Pat. No. 6,513,084titled "Arbitrating State Changes" which issued on Jan. 28, 2003, and U.S. patent application Ser. No. 10/379,605 titled "Dynamic Synchronization of Tables," all of which are assigned to the same assignee as the present patent application.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1998, Microsoft Corporation, All Rights Reserved.

BACKGROUND OF THE INVENTION

In a network in which multiple computers each process changes against the state of a shared entity, such as a database table, some mechanism must be employed to ensure that changes made on one computer will be reflected on all others. When a new computer is introduced into the network that needs a copy of the shared entity, there must be a way to load the data onto the new computer. In a static network in which a lock server or locking protocols are used to control the application of changes, the lock server or locking protocols force a quiescence period long enough for the data to be copied to the new computer.

Consider the analogy of a meeting in which one participant is late. The meeting halts until the late person can be brought up to date.

However, in a dynamic network that requires that changes to the network configuration be made without impacting the processing of the computers already in the network, there needs to be a mechanism to copy the shared entity onto the new computer while changes are being made to the table on other computers. In addition, all those changes must be factored into the entity on the new computer before the computer is brought online.

SUMMARY OF THE INVENTION

The above-mentioned shortcomings, disadvantages and problems are addressed by the present invention, which will be understood by reading and studying the following specification.

Each node in a network accessing a common database caches a copy of the database tables it uses and updates those tables based on changes made by other nodes in a coherent cache, i.e., those node that also have a copy of the tables in their cache. When a new node joins the coherent cache, one of the existing nodes acts as a source to populate the table(s) required on the new (destination) node from its own copy using a dynamic synchronization method of the present invention. The dynamic synchronization method controls the population operation and allows for the populating of tables on the destination node from partially populated tables on the source node. The dynamic synchronization of the tables permits database updates to continue to be made to the tables by the existing nodes in the coherent cache and provides a mechanism to propagate the committed updates to the tables on the destination node. Once the tables on the destination node are fully populated, all pending updates are suspended while a snapshot of the state of the table on the source node is taken. After the destination node has processed the snapshot, transactions active on the source node that meet certain criteria are initiated on the destination node and transactions local to the destination node are applied to the table.

Using the meeting analogy mentioned above, the dynamic synchronization process is analogous to appointing one person to brief the late arrival while the meeting continues. Once the late person has been told what happened before he arrived, the briefer informs him of what happened while he was being briefed. Thus, the invention allows a dynamically changing table to be copied from one computer to another while still incorporating those changes, and without requiring that activity on the table be stopped for any significant period of time.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular implementation of the invention is described for use with Microsoft Corporation's In-Memory Database system. Finally, in the fifth section, a conclusion of the detailed description is provided.

Hardware and Operating Environment

Figure 1A:
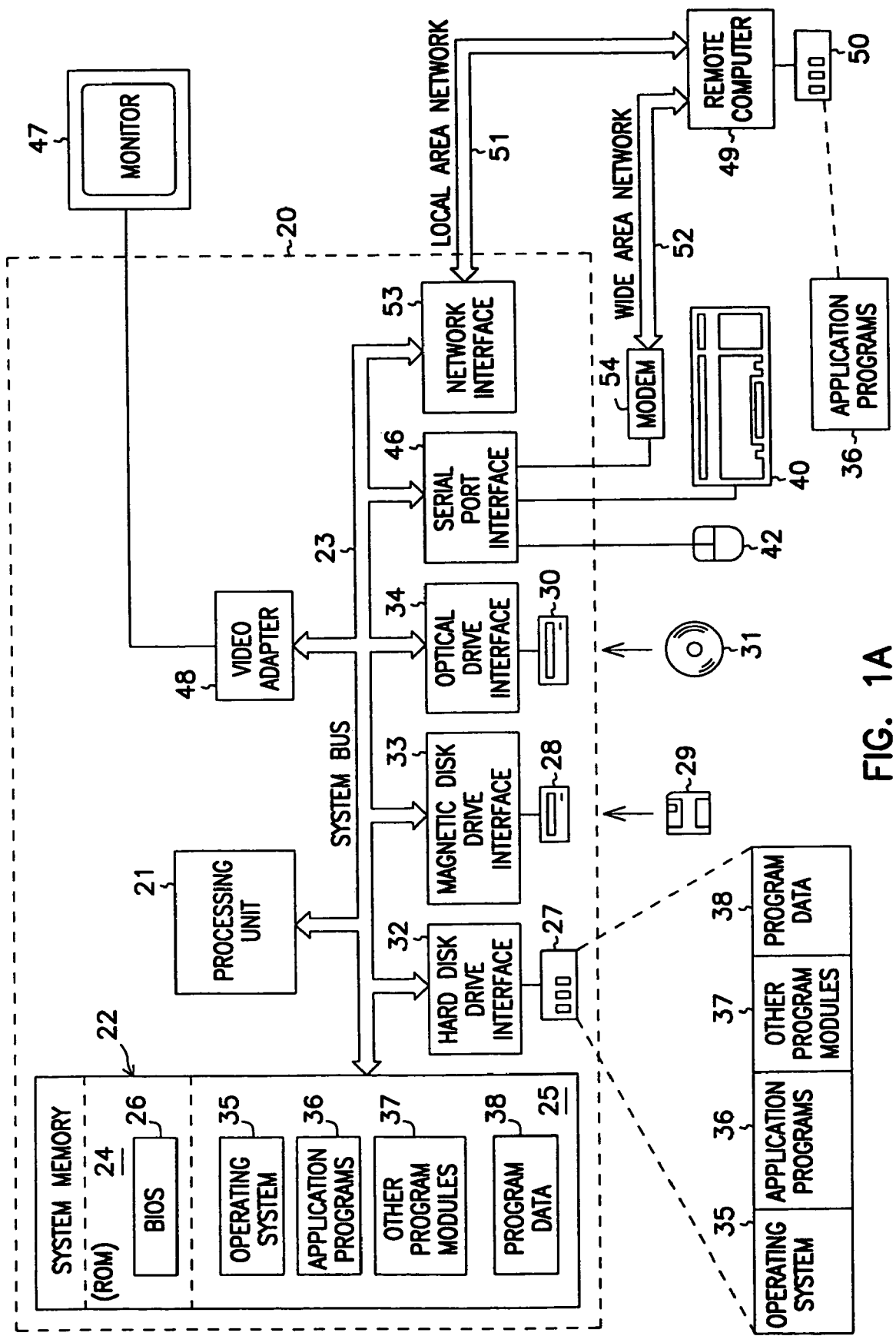
FIGS. 1A and 1B are diagrams of the hardware and operating environment in conjunction with which embodiments of the invention may be practiced.

FIG. 1A is a diagram of the hardware and operating environment in conjunction with which embodiments of the invention may be practiced. The description of FIG. 1A is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1A for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1A. The logical connections depicted in FIG. 1A include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Figure 1B:
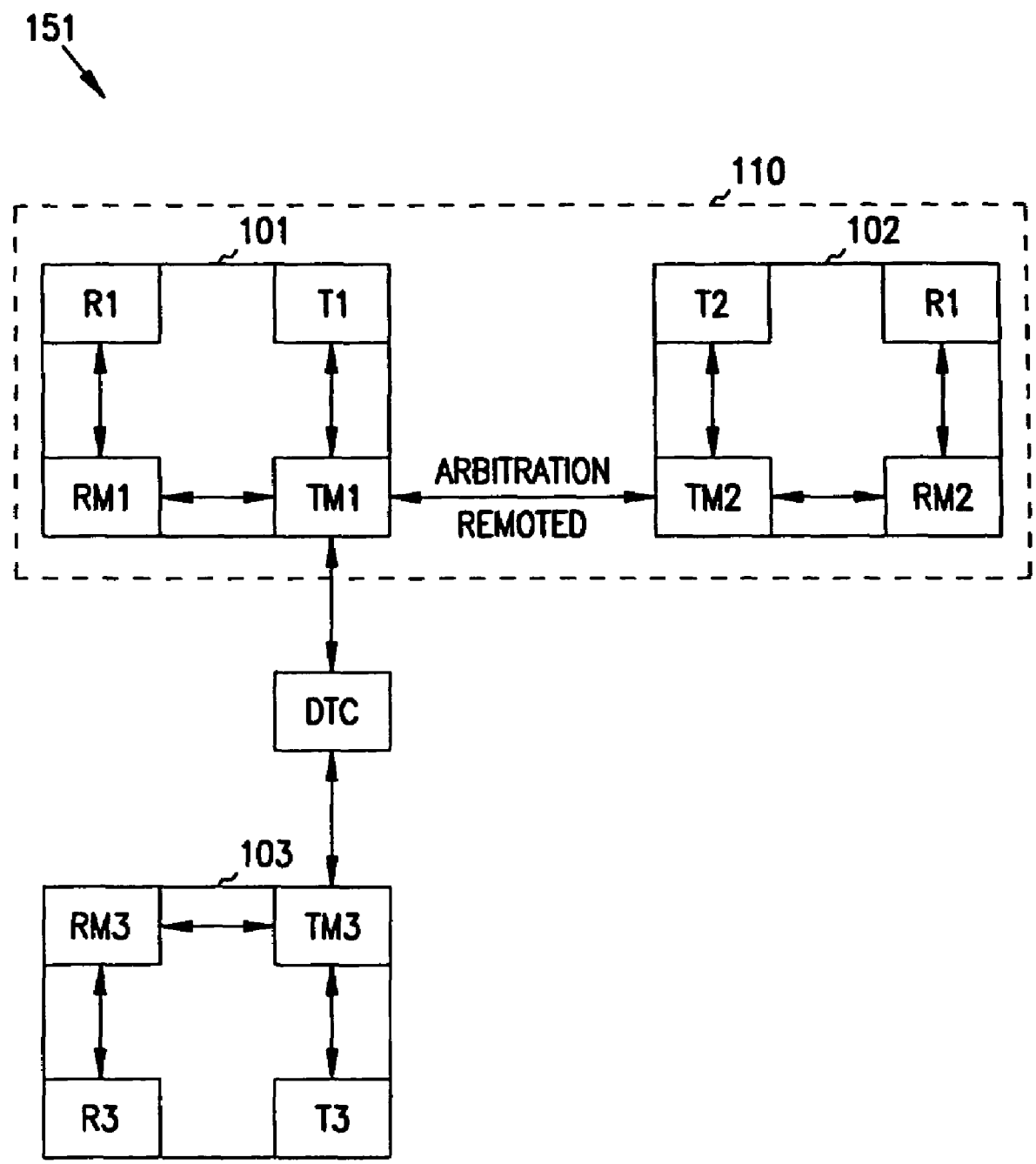

FIG. 1B illustrates a local-area network 151, such as LAN 51, with three nodes 101, 102, 103, such as computers 20 and 49, in which the present invention can be practiced. The LAN 151 is assumed have low latency and to guarantee that data and messages sent from one node will arrive at a second node in the order sent. The LAN 151 is also assumed to operate as a distributed transaction environment so that a transaction started by an application on one node can access a resource stored on another node. In one exemplary embodiment of such a distributed transaction environment, each node 101, 102, 103 executes a local resource manager (RM) that controls access to a resource (R) on the node, such as a database, and also executes a local transaction manager (TM) that maintains a list of transactions (T) executing on the node and which resource manager(s) are involved with each transaction.

Changes made by a transaction are applied to the resource using a two-phase commit process. When the transaction commits its work, the local transaction manager sends a "prepare to commit" message to each involved resource manager (phase I: prepare). Each involved resource manager responds with a "yes, I can commit" or a "no, I cannot commit" message. If each involved resource manager responses "yes" then the transaction manager instructs the resource managers to apply the changes (phase II: commit). If any involved resource manager responds "no" then the transaction manager informs the resource managers to abort the changes (phase II: abort).

When the transaction involves only resources on the local node, it is referred to as a local transaction. A local transaction is illustrated on node 101, where transaction T1 has requested a change on resource R1. The local transaction TM1 communicates with RM1. When T1 commits the change, TM1 sends a phase I message to RM1, RM1 responds with "yes" and TM1 sends the corresponding phase II message to RM1 to apply the change to R1.

When a transaction makes changes to resources on more than one node, the transaction "enlists" with a distributed transaction coordinator (DTC). DTC coordinates the two-phase commit process among the transaction managers on the nodes involved in the transaction. An enlisted transaction is also referred to as a DTC transaction. Thus, if transaction T1 on node 101 needs access to resource R3 on node 103, it enlists through its transaction manager TM1 with DTC. DTC communicates T1's access request to TM3, which creates a DTC transaction T3 on node 103 to process the request. DTC is responsible for coordinating the two-phase commit process among nodes 101 and 103 using a DTC protocol that includes "prepare to commit," "commit," "abort," and "flush data" notifications.

In FIG. 1B, node 101 and node 102 are each caching a copy of a database table as resource R1. The table can be permanent table that is stored on a backend database server (not shown), or a temporary table that is created in cache as a result of database transactions. Nodes 101 and 102 form a "coherent cache" 110 in that changes that are committed on the copy of the table R1 on one of the nodes will be reflected on the copy of the table R1 on the other node through an arbitration mechanism described in the co-pending, related patent application entitled "Arbitrating State Changes," hereinafter referred to as the "arbitration patent" and summarized next.

When multiple nodes in a computer network perform work on a shared entity, such as a database record, the arbitration mechanism is used to ensure different changes made on more than one node to the same data is propagated to each of the nodes holding the shared entity and that the changes are applied in the same order on each of the nodes. An arbitration cycle for a particular entity is begun on a node ("instigator") when the node broadcasts a proposal message for a change to the entity to the other nodes or when the node ("observer") receives such a proposal message. Multiple nodes can be instigators during a single arbitration cycle. Each node that receives a proposal message sends a response message to the corresponding instigator. The arbitration cycle is closed to additional proposal messages after one instigator has received responses from all the nodes that share the entity.

After each instigator node receives all the proposals in the arbitration cycle, it determines whether it is the winner of the arbitration cycle and broadcasts a closure message if it is. Each node determines an order in which to apply the changes proposed in the arbitration cycle when it knows it has received all the proposals in the arbitration cycle as determined by the sending or receiving of the closure message. The changes are applied through the normal transaction processing environment on the node using a "remote transaction" for each proposed change. The node that originates a proposal message is responsible for forwarding all DTC notifications associated with the change to each of the other nodes in the coherent cache, i.e., commit, abort, prepare to commit, and flush data for the remote transactions active on those nodes. Referring back to FIG. 1B, when transaction T1 proposes a change to the database table R1 that is cached on node 101 and also on node 102, the transaction manager TM1 on node 101 instigates an arbitration cycle by sending a proposal message to the transaction manager TM2 on node 102. Once the arbitration cycle is complete, TM2 creates a remote transaction T2 to apply the change to the copy of R1 on node 102. When TM1 finishes its two-phase commit process with regard to local transaction T1, it "remotes" a commit or abort notification to TM2, which causes the remote transaction T2 to commit or abort accordingly.

Because each arbitration cycle is associated with a particular entity, multiple arbitration cycles associated with different items can be running concurrently in the network but multiple arbitration cycles for the same item must be executed serially. The arbitration process is executed even if there is only one proposal made in an arbitration since the arbitration process enables the orderly propagation of changes across all the nodes.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

Figure 2A:
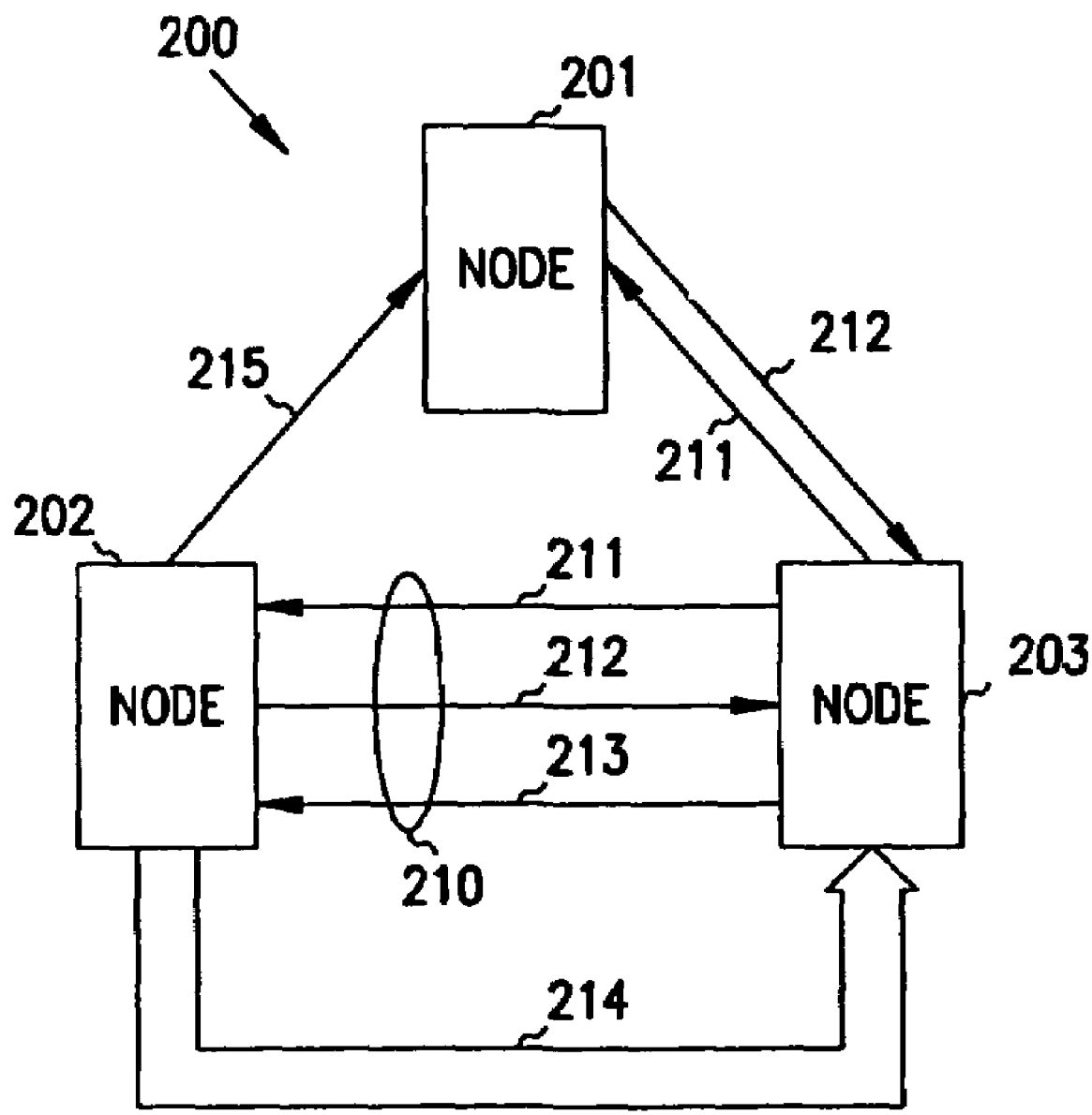
FIG. 2A is a diagram illustrating a system-level overview of an exemplary embodiment of the invention when dynamically synchronizing a table in a three-node network.
Figure 2B:
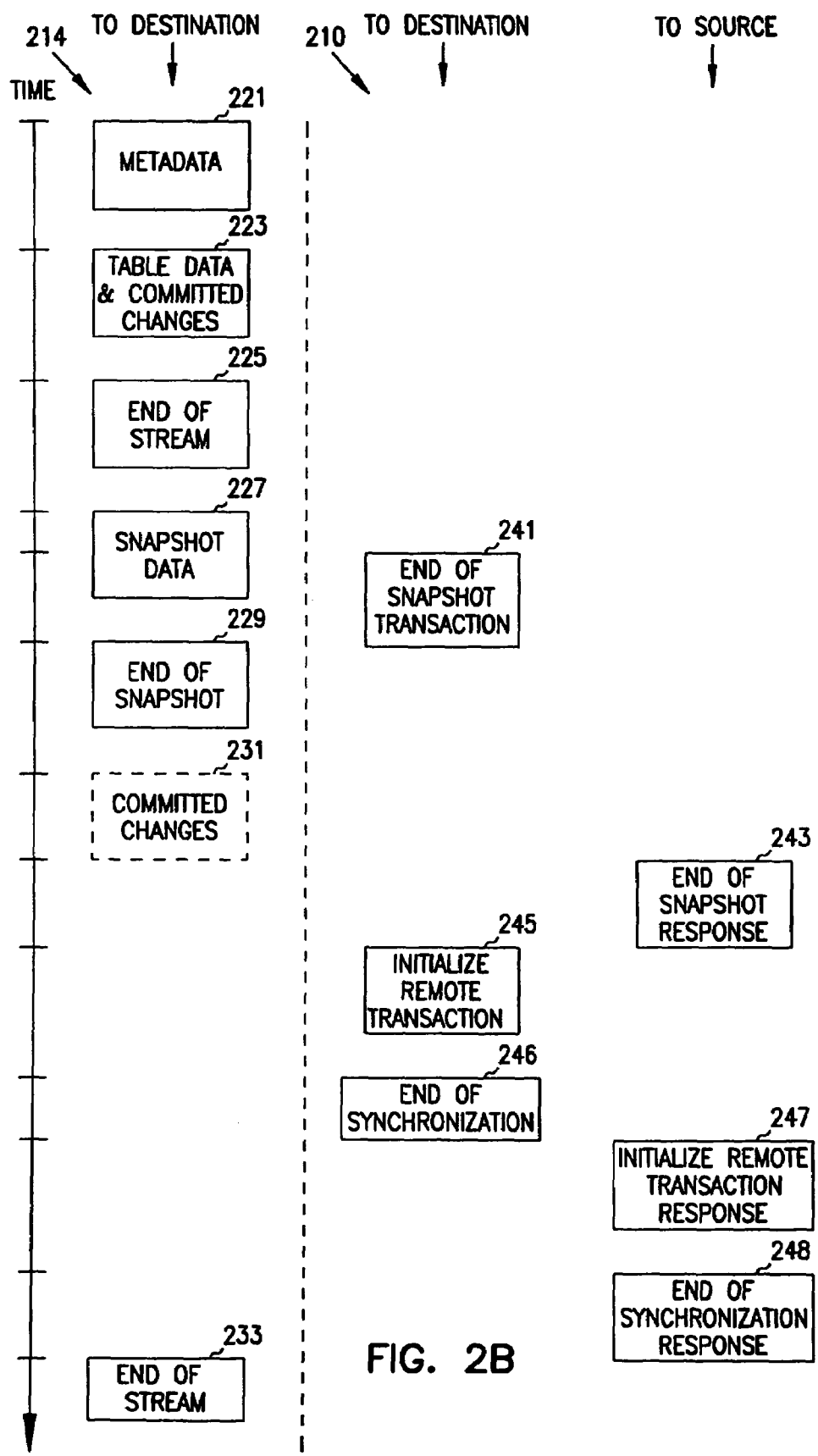
FIG. 2B is a diagram illustrating a synchronization stream of data and messages exchanged between two nodes in accordance with the exemplary embodiment of the invention shown in FIG. 2A.

A system level overview of the operation of an exemplary embodiment of the invention is described by reference to FIGS. 2A and 2B. FIG. 2A illustrates the general message flow among three computer nodes 201, 202, 203, such as nodes 101, 102, 103, in FIG. 1B, in performing dynamic synchronization of a database table from a source node to a destination node. FIG. 2B shows a more detailed timeline of data and messages that comprise a synchronization stream exchanged between the source and destination nodes.

In FIG. 2A, node 201 and node 202 form a coherent cache on a database table. Node 203 is a node that needs a copy of the database table that is cached on nodes 201 and 202. Because the table is already cached on nodes 201 and 202, it can be changed by the arbitration mechanism while the copy of the table is being created on node 203. Although it is possible to halt all updates while a new node is being added or removed from the coherent cache, such a period of quiescence negatively impacts the performance of the other nodes in the coherent cache. Instead, the table on the node 203 is populated from the existing copy of the table on either node 201 or node 202 through the dynamic synchronization process of the present invention.

Node 203 broadcasts a "get best endpoint" message 211 to node 201 and node 202. Nodes 201 and 201 each determines if it is either caching the table or is populating the table from the backend. Each node responds with a "get best endpoint response" message 212 that contains a numerical ranking indicating the suitability of the node as a synchronization source. In the present exemplary embodiment, the ranking is determined by whether the node has a copy or is in the process of populating the table from the backend database, and by the level of activity on the computer (e.g., recent CPU utilization), where ranking of zero means that the node is neither populating the table nor has a coherent copy of it in cache.

In the scenario illustrated in FIG. 2A, when node 203 evaluates the information in the best endpoint response messages 212, it determines that node 202 has the highest non-zero ranking and sends a message 213 to node 202 that is has been designated as the source for the synchronization of the table on node 203. Node 203 is designated the destination node. A dedicated network channel 214 is created to stream synchronization data from the source node 202 to the destination node 203. Synchronization messages are passed between the two nodes 202, 203 through the normal messaging channel 210 provided by the underlying network.

As shown in FIG. 2B, the synchronization stream 214 begins with metadata 221 that described the structure of the table, followed by record data 223 for the table. The record data 223 includes committed changes to the table interspersed with static table data. Although illustrated as discrete blocks in FIG. 2B, the metadata 221 and the record data 223 represent streams of data sent to the destination node 203. Once the source node 202 has sent all the data in the table and the committed changes to the table, the source node 202 sends an "end of stream" indicator 225 to the destination node 203 and broadcasts a message 215 (FIG. 2A) to the other nodes in the coherent cache, i.e., node 201, that the destination node 203 is now caching the table.

At this point, the destination node 203 must be brought online with an identical copy of the table as appears on the source node 202, including any changes which have been made to table data previously sent to the destination node 203, before the table can be modified by transactions executing on the destination node 203. Therefore, the source node 202 performs a "snapshot" to insure that all uncommitted changes that are in progress are present on the destination node. The snapshot captures the state of all arbitrations and active transactions, i.e., neither committed or aborted, involving the table being synchronized. The snapshot data 227 is sent to the destination node 203. Although the snapshot data 227 is shown as a discrete block in FIG. 2B, it represents a stream of data that makes up the snapshot.

During the creation of the snapshot, all pending arbitrations on the table are frozen on the source node 202 (which in turn freezes the corresponding arbitration cycles on all nodes in the coherent cache) to insure that no new transactions are started that would apply further changes to the record described by the arbitration. Each transaction already in process on the source node 202 that attempts to change the table is suspended for the time it takes to transmit the corresponding snapshot data. As discussed below, the size of the snapshot is bounded by the set of transactions that are operating at the point in time the snapshot is begun and will not grow in the process of creating the snapshot.

Once a transaction is released during the snapshot process, it continues processing asynchronously to the synchronization process and can commit or abort before the snapshot data is completely streamed to the destination node 203. Information regarding the outcome of a transaction whose state has been sent previously to the destination node 203 as part of the snapshot data 227 is sent to the destination node 203 through the messaging channel 210 in an "end of snapshot transaction" message 241. Upon receiving an end of snapshot transaction message 241, the destination node 203 throws away the uncommitted transaction state and the arbitration contents associated with the transaction because the corresponding transaction will no longer be active at the end of the snapshot.

The snapshot data 227 is followed in the synchronization stream 214 by an "end of snapshot" indicator 229. The destination node 203 replies with an "end of snapshot response" message 243, which causes the source node 202 to send an "initialize remote transaction" message 245 through the message channel 210 for each active transaction. The initialize remote transaction messages 245 inform the destination node 203 as to which transactions must be initiated ("hooked up") on the destination node 203 for subsequent processing. Because transactions on the source node 202 are active between the sending of the end of snapshot indicator 229 and the initialize remote transaction messages 245, any resulting committed changes 231 are sent to the destination node 203 in the synchronization stream 214. After the initialize remote transaction messages 245 are sent to the destination node 203, the source node also sends an "end of synchronization" message 246 to the destination node 203.

The destination node 203 responds with an "initialize remote transaction response" message 247 for each initialize remote transaction message 245 sent by the source node 202. The initialize remote transaction response message 247 is positive if the destination node 203 initializes the transaction. If the initialize remote transaction response message 247 is negative, the destination node is already processing the transaction in response to information received from node 201 or from directly from DTC, information that the synchronization source 202 will also be receiving and processing from node 201 or DTC, so the synchronization source waits until it has processed the transaction in response to receiving the information from node 201.

Once the destination node has sent all the initialize remote transaction response messages 247, it sends an "end of synchronization response" message 248 to the source node 202 in response to the end of synchronization message 246 sent by the source node. The source node responds by placing an end of stream indicator 233 in the synchronization stream 214 to signal the end of the committed changes 231 and the end of the snapshot. At this point, all transactions on the source node 202 will have been committed, aborted, or hooked up on the destination node 203. Synchronization of the table is now complete.

The scenario in FIG. 2A assumes that both nodes 201 and 202 are caching the table needed by node 203. If neither was, then the table must be a backend table since a temporary table, by definition, exists on some other node. In this case, the node 203 attempts to populate the table from the backend by sending an arbitration proposal to nodes 201 and 203 as described in the arbitration patent. The arbitration mechanism prevents multiple nodes from populating from the backend at the same time to avoid the situation in which a computer is populating the table from the backend while another computer has the table loaded and is making changes to it. If node 203 wins the arbitration, it populates the table from the backend by loading the table data into its cache in primary key order. Otherwise, node 203 waits a pre-determined amount of time and resends the "get best endpoint" messages to nodes 201 and 202. The arbitration process in this situation is described in the arbitration patent and is thus not illustrated. A detailed description of one embodiment of a method that populates a table from the backend is provided in the next section.

The system level overview of the operation of an exemplary embodiment of the invention has been described in this section of the detailed description. A node that needs a copy of a table chooses a node that is caching the table to act as the source for the table. The source node places the static table data in a stream and sends to the destination node. When the source node has sent all the data, it snapshots the state of the table to propagate uncommitted changes to the destination node, and then tries to initiate active transactions on the destination node. The source node also notifies the destination node of commits and aborts that occur on the table while the synchronization is taking place. While the invention is not limited to any particular network configuration, for sake of clarity a simplified three node network has been described.

Methods of Exemplary Embodiments of the Invention

In the previous section, a system level overview of the operations of exemplary embodiments of the invention was described. In this section, the particular methods performed by computers executing such exemplary embodiments are described by reference to a series of flowcharts. The methods to be performed constitute computer programs made up of computer-executable instructions. Describing the methods by reference to a flowchart enables one skilled in the art to develop such programs including such instructions to carry out the methods on suitable computer (the processor of the computers executing the instructions from computer-readable media). FIGS. 3A-H are flowcharts of methods performed by a node acting as a-synchronization source, such as node 202 in FIG. 2A, to create the synchronization stream. FIGS. 4A-C are flowcharts of additional methods that are executed by the source node when committing changes to a table being synchronized. The additional method illustrated in FIG. 4C is also used when aborting changes to a table being synchronized. FIGS. 5A-F are flowcharts of methods to be performed by a destination node to create the table from the synchronization stream.

Source Node Methods

Figure 3A:
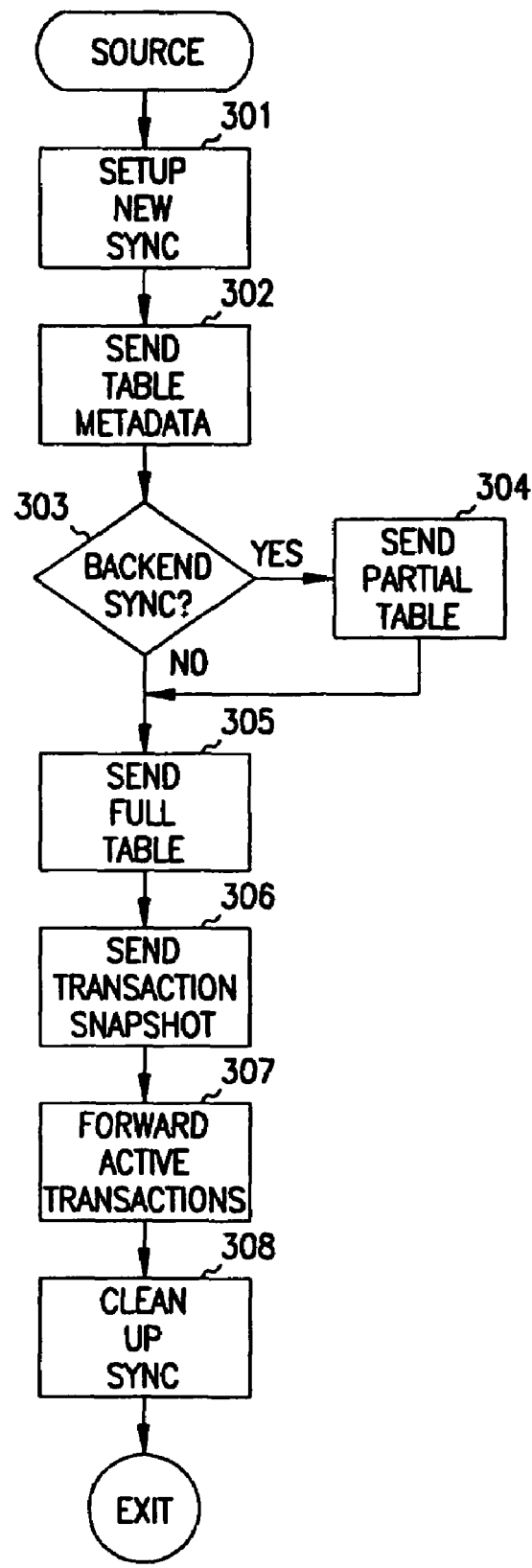
FIGS. 3A and B are flowcharts of methods to be performed by a source node to create a synchronization stream according to an exemplary embodiment of the invention.
Figure 4A:
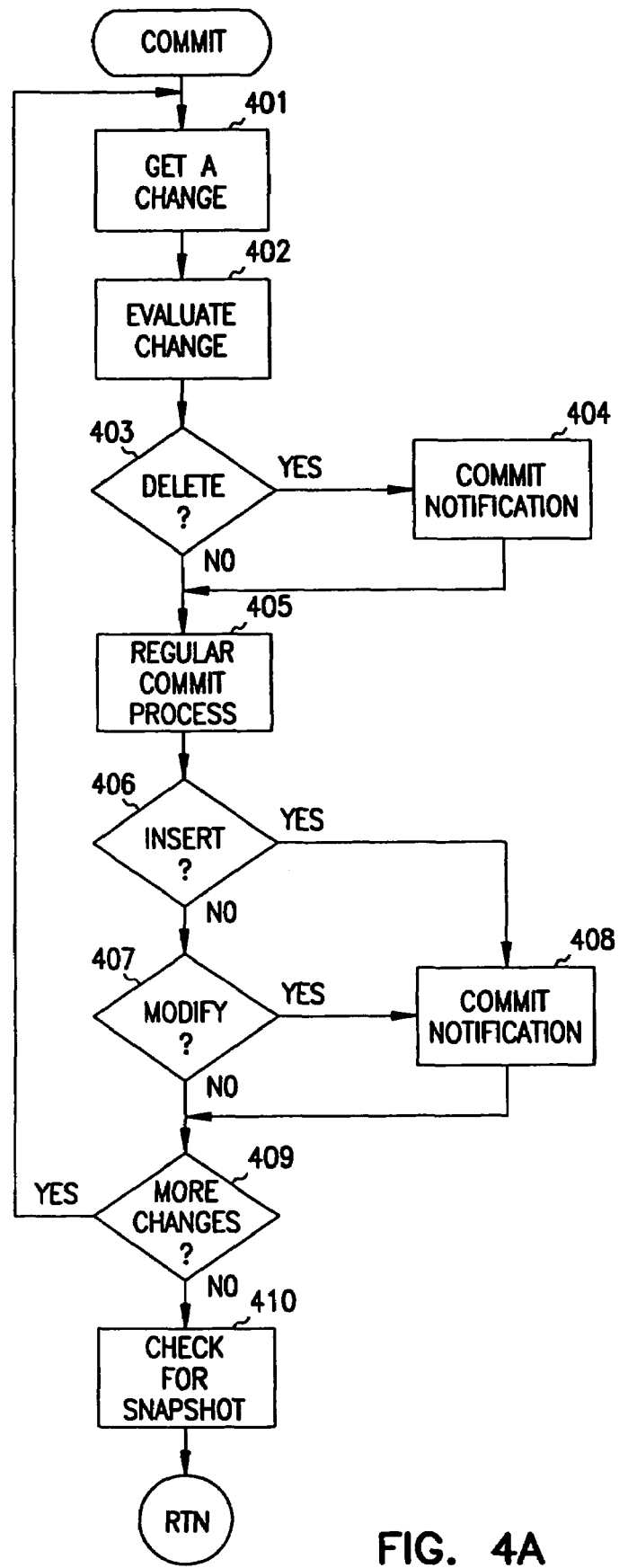
FIGS. 4A, B and C are flowcharts of a method to be performed by a source node when committing changes to a table being synchronized.
Figure 4B:
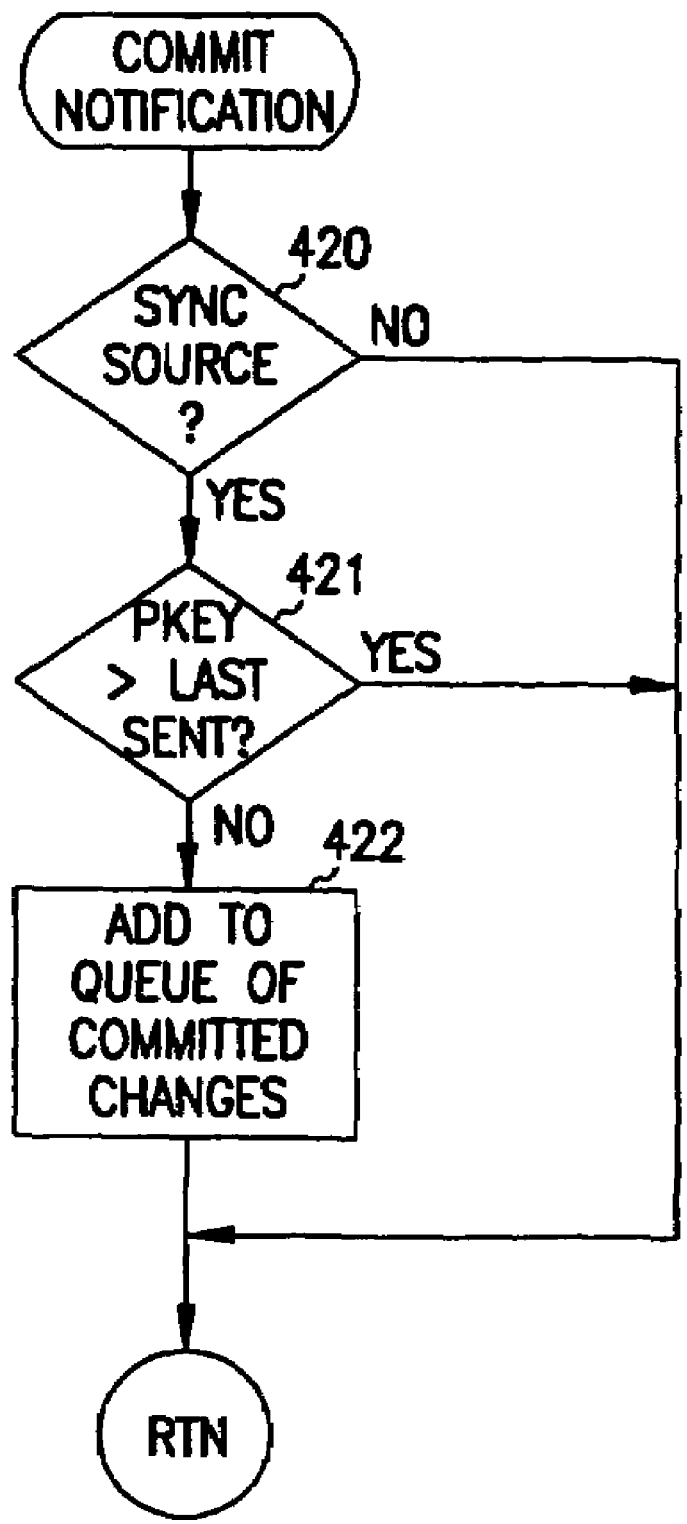
Figure 4C:
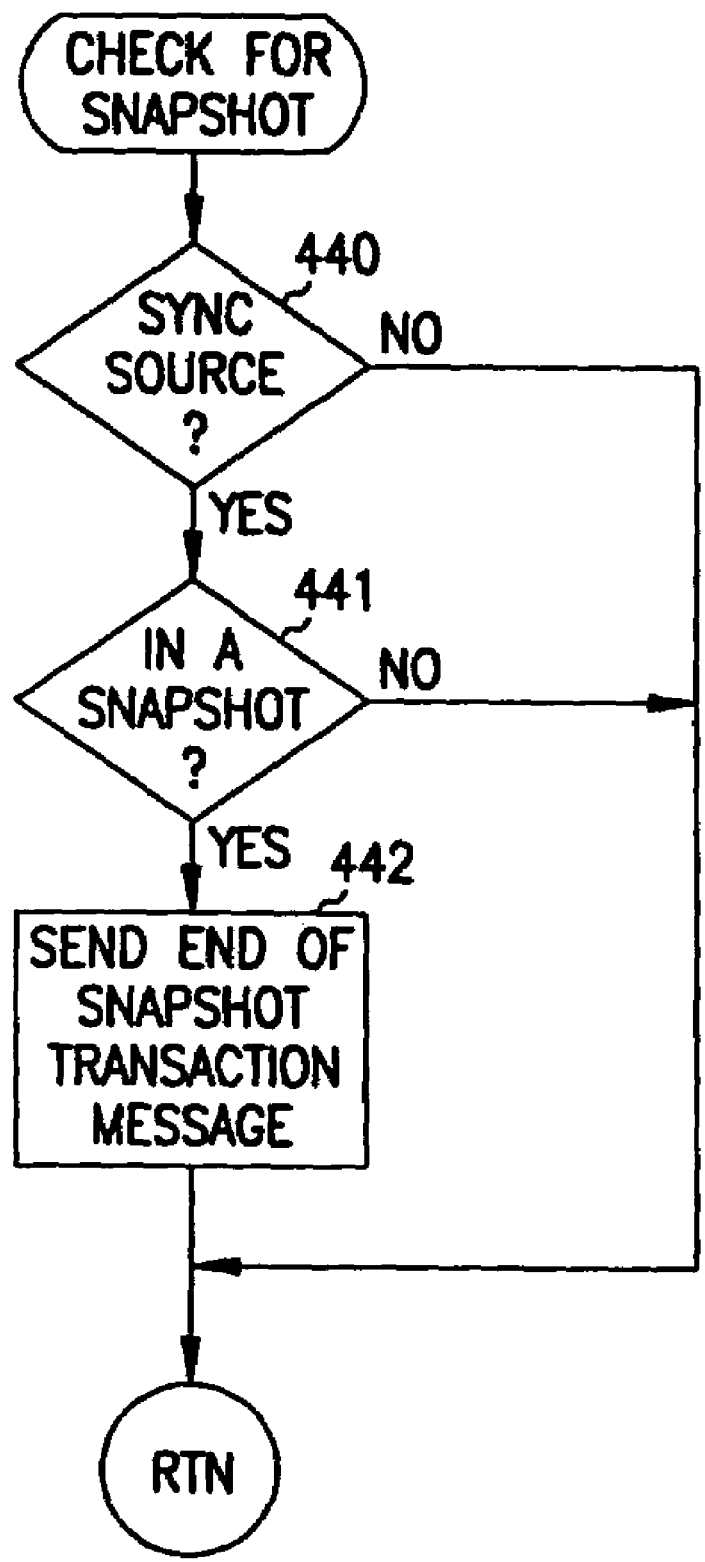

Referring first to FIG. 3A, the source node sets up a new synchronization thread for the particular table and destination node at block 301. In an exemplary embodiment executing in an object-oriented operating environment, a new synchronization source object describing the state of the synchronization process is created at block 301. There is one synchronization source object for each destination node that is synchronizing the particular table from this source node. Block 301 also includes the mechanics of establishing a synchronization stream between the two nodes, which is not described further as it depends on the type of underlying network and such a process will be readily understood by one skilled in the art.

The synchronization thread on the source node begins streaming data to the destination node by first sending the metadata for the particular table that is to be synchronized (block 302). In the present exemplary embodiment, the metadata describes the columns and indexes that make up the table.

If the table on the source node itself is being populated from the backend database server (block 303), the table data on the source node resides in temporary data structures. The synchronization thread on the source node sends all the data currently in the temporary data structures to the destination node at block 304 until all the table data is received by the source node from the backend. This process is described further in conjunction with FIG. 3C below.

At block 305, the synchronization thread on the source node sends data from the fully populated table to the destination node and data representing committed changes. If the destination node was previously receiving data from the temporary data structures on the source node, any data in the fully populated table that was not already sent to the destination node is transmitted. The process represented by block 305 is described in more detail in conjunction with FIG. 3D below.

Once all the table data has been sent, the synchronization thread on the source node performs the processing necessary to create and send the snapshot data at block 306. The process represented by block 306 also includes additional operations and is described further below in conjunction with FIG. 3E.

When the destination node indicates that is has completed processing the snapshot data by returning an end of snapshot response message, the synchronization thread on the source node forwards all active transactions (block 307) to the destination node to be hooked up on the destination node. The initialization process for active transactions is described in conjunction with FIG. 3G below.

After all active transactions have been forwarded to the destination node, the synchronization thread on the source node performs processes (block 308) that complete the synchronization process and clean up all supporting data structures. The clean up process is described in conjunction with FIG. 3H below.

Figure 3B:
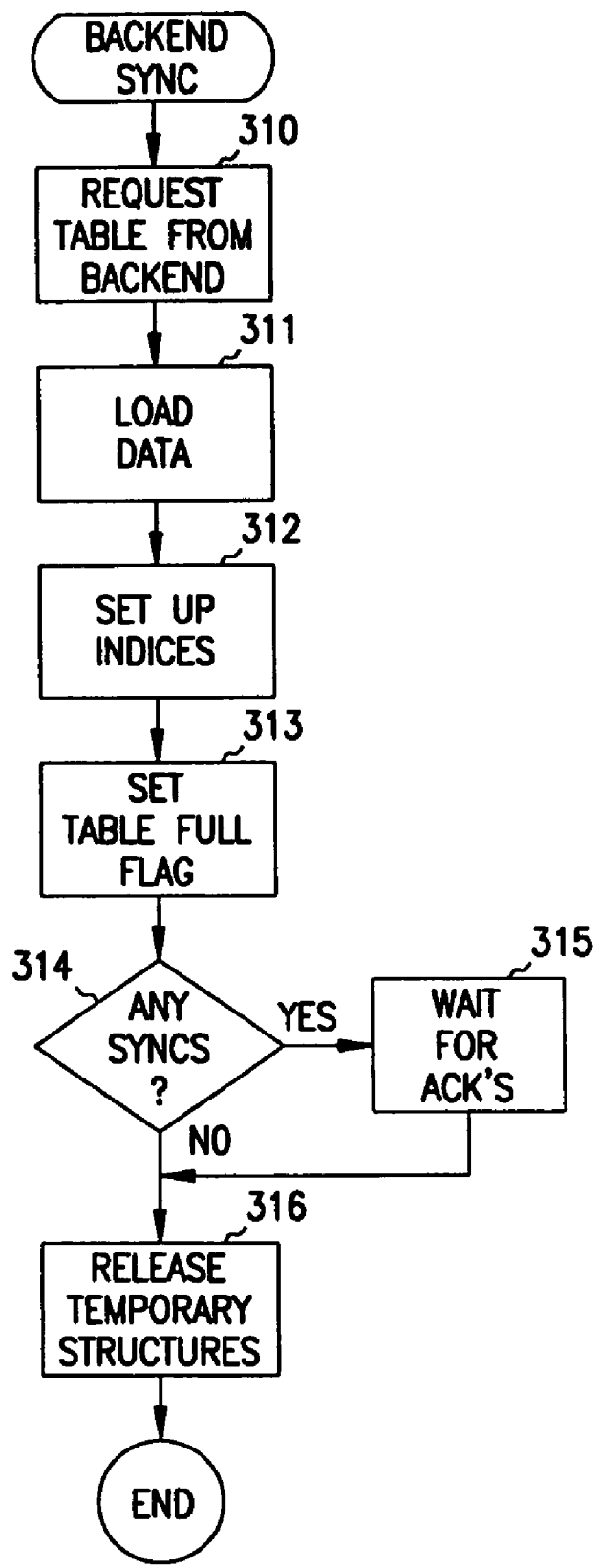
FIGS. 3C, D, E, F, G and H are flowcharts illustrating details of the method of FIG. 3A.

FIG. 3B sets forth the processes performed by a node when populating a table from the backend database server. The node requests the appropriate table from the backend (block 310) and sets up temporary data structures to hold the data as it is being sent from the backend (block 311). Once all the data has been received by the node, it creates the table indices at block 312. The table is now fully populated on the node, so a table full flag is set at block 313.

When the node is concurrently acting as a synchronization source for the table (block 314), there can be multiple synchronization threads executing on the node and asynchronously sending data to destination nodes. Therefore, the node waits at block 315 for acknowledgments from all synchronization threads for the table that each has detected that the table is now fully populated. If the node is not actively synchronizing any destination nodes, or when all synchronization threads have acknowledged that table is fully populated, the node releases its temporary data structures at block 316.

Figure 3C:
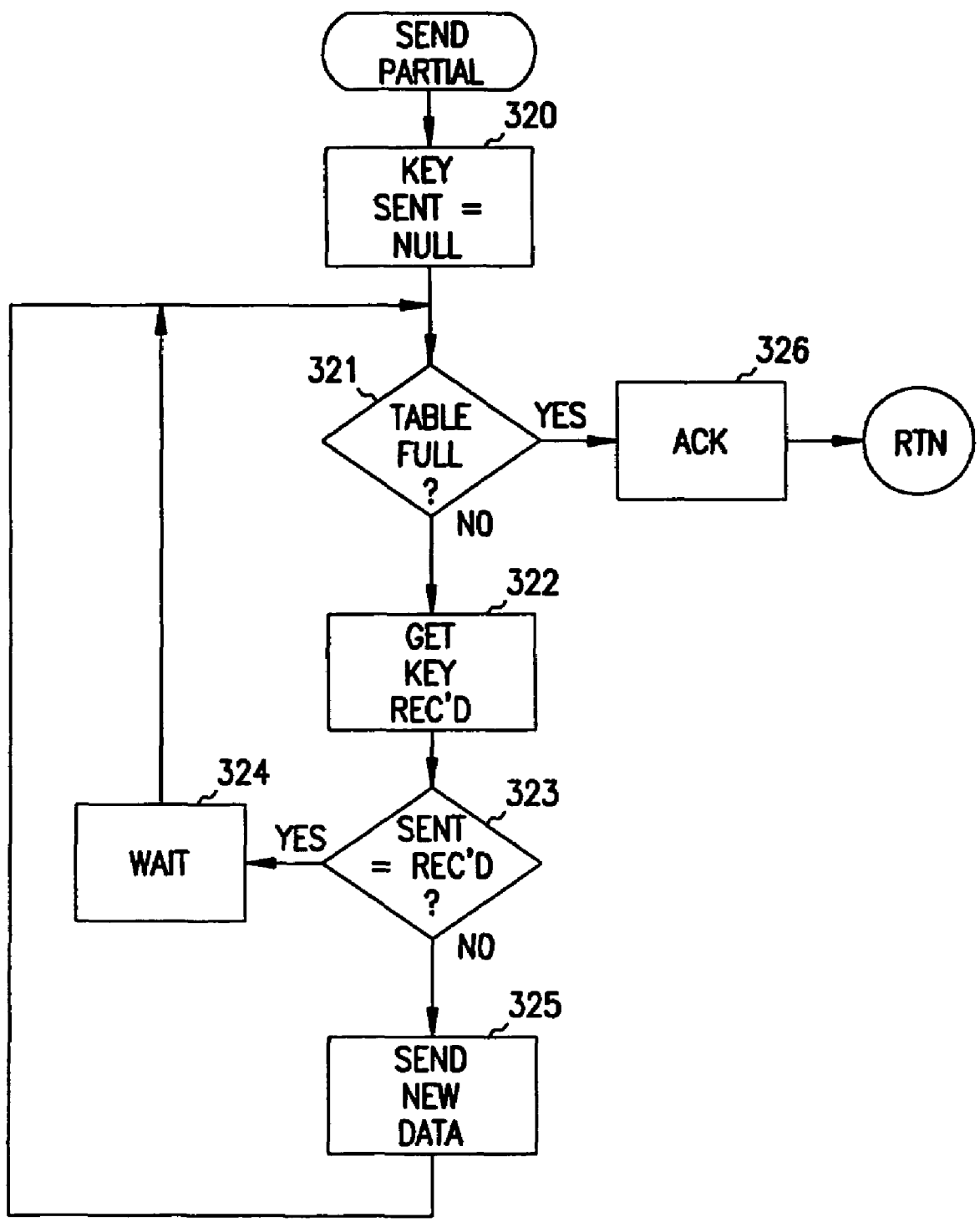

Turning now to FIG. 3C, the processing performed by the synchronization thread to populate a table when the table on the synchronization source itself is being populated from the backend database server is next explained. In the present exemplary embodiment, the process of populating the table from the backend is described as being performed in primary key order. One of skill in the art will readily appreciate that any index key, or combination of keys, can be substituted for the primary key of the table, provided that the substitute uniquely identifies the data record.

The synchronization thread keeps track of the primary key of the last record sent to the destination node for the particular table. In the object-oriented embodiment described above, this information is maintained in the synchronization object. When the synchronization thread is initially set up, the primary key of the last record sent is NULL (block 320). If the table full flag is not set (block 321), the primary key of the last record received from backend database server is obtained at block 322 and compared with the primary key of the last record sent to the destination node at block 323. If the primary key of the last record sent to the destination node is less than the primary key of the last record received from the backend, at block 325 the synchronization thread sends all records received from the backend since the last record was sent to the destination node. The synchronization thread also sets the last key sent to the value of the last new data record sent to the destination source at block 325. If there is no new data in the table, i.e., the primary key of the last record sent is the same as the primary key of the last record received at block 323, the synchronization thread waits at block 324 for a predetermined period of time to allow additional table data to be entered into the temporary data structures on the synchronization source.

The synchronization thread continues looping through the process shown in FIG. 3C until it detects that the table has been fully populated on the synchronization source (block 321). At that point, the synchronization thread sends an acknowledgement message at block 326 to the synchronization source and begins populating the destination node from the fully populated table as described next.

Figure 3D:
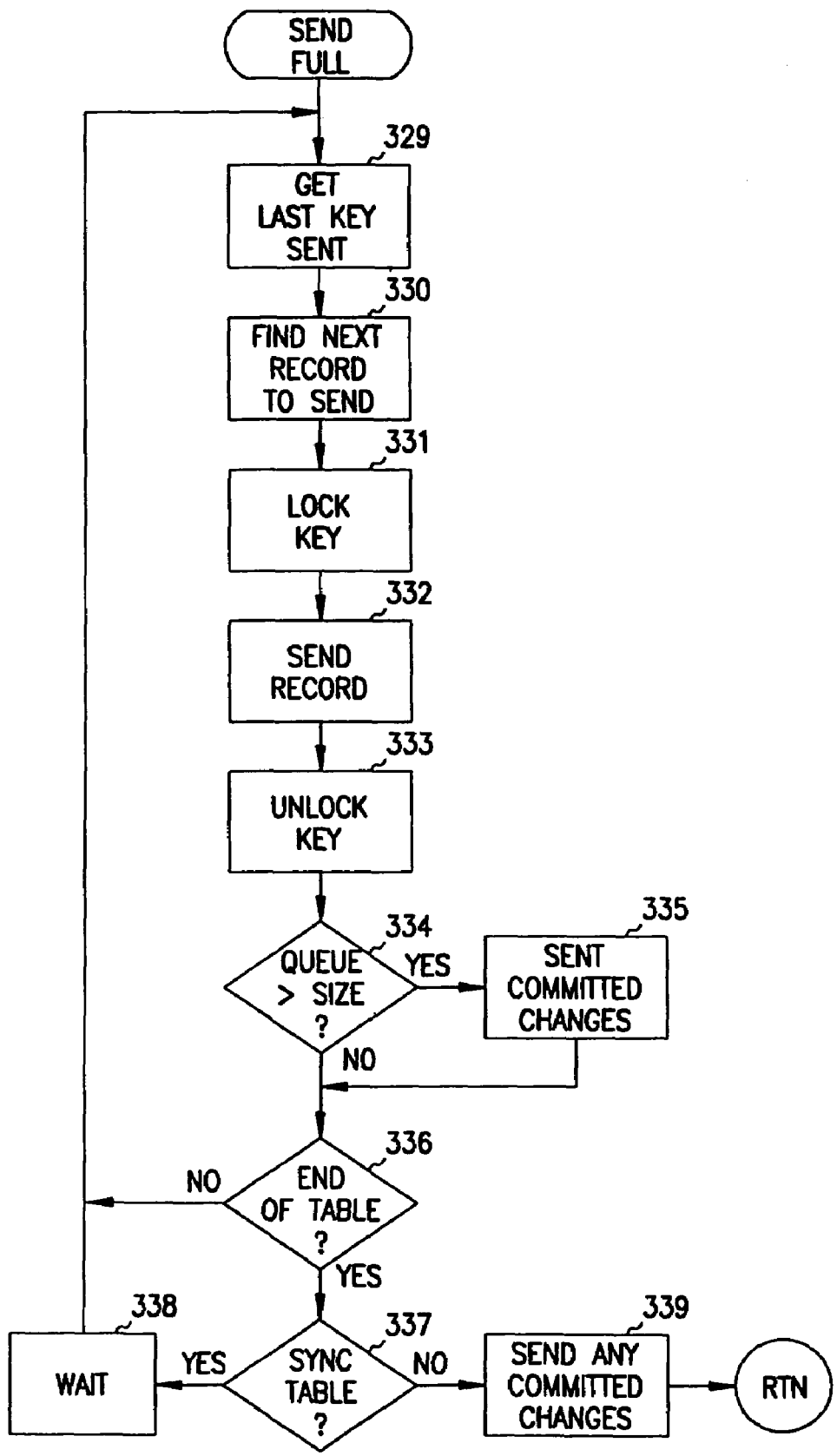

FIG. 3D illustrates the processing that is performed when synchronizing from a fully populated table. At block 329, the synchronization thread determines the primary key of the last record sent to the destination node, if any. The thread uses the primary key index to determine the next record in the table that needs to be sent to the destination node, i.e., has a primary key greater than that of the last record sent (block 330). The synchronization thread uses a special locking protocol on the records it reads to prevent conflicts between the synchronization thread and any thread that is committing a transaction against the table on the source node since the threads operate asynchronously and both base their operations on the primary key. A further discussion of one type of conflict that can arise appears below in conjunction with the description of the commit process illustrated in FIG. 4A. When reading a record, the thread acquires a synchronization lock on the primary key for that record (block 331) to force a thread that wants to commit a change to the record to wait until the synchronization thread has finished with the record. The synchronization lock also prevents a new primary key from being inserted into the table on the source node between the key of the previous record and the key of the current record. After the thread sends the record to the destination node (block 332), it releases the synchronization lock (block 333).

Because transactions on the source node table can commit while the table is being sent to the destination node, the commit thread executing on the source node places committed changes that must be sent to the destination node on a queue of committed changes. This process is described further below in conjunction with FIGS. 4A and 4C. After the synchronization thread sends a record to the destination node, it checks to see if the queue of committed changes is greater than a pre-determined size (block 334). If so, the committed changes in the queue are sent to the destination node (block 335) in the synchronization data stream. The synchronization thread continues sending table data and committed changes to the destination node until all the records in the table (block 336) and all the committed changes in the queue (block 339) have been sent.

Not only is it possible to synchronization from a node that is populating the table from the backend but also to synchronization from a node that is itself synchronizing the table from another node, i.e., the synchronization source node is also a destination node. When synchronizing the table from a fully populated table on a third node, the table is populated on the synchronization source node in primary key order and essentially looks like any other database table except that it is not fully populated. In an alternate exemplary embodiment also illustrated in FIG. 3D, the synchronization thread executes the method described immediately above but performs an additional test when it reaches the end of the table on the source node. At the end of the table, the synchronization thread determines if the table is fully populated or is in fact being synchronized from another node (block 337). In the latter case, because the source node table may not yet be fully populated, the thread waits for a pre-determined interval (block 338) and then processes any new data that has been added to the table during the interval. In one exemplary embodiment, the synchronization thread sets up an event that is awakened when additional records have been added to the partially synchronized table and waits on that event. The thread that is populating the table on the synchronization source periodically wakes up any synchronization thread waiting for additional data as described in conjunction with FIG. 5A below.

Figure 3E:
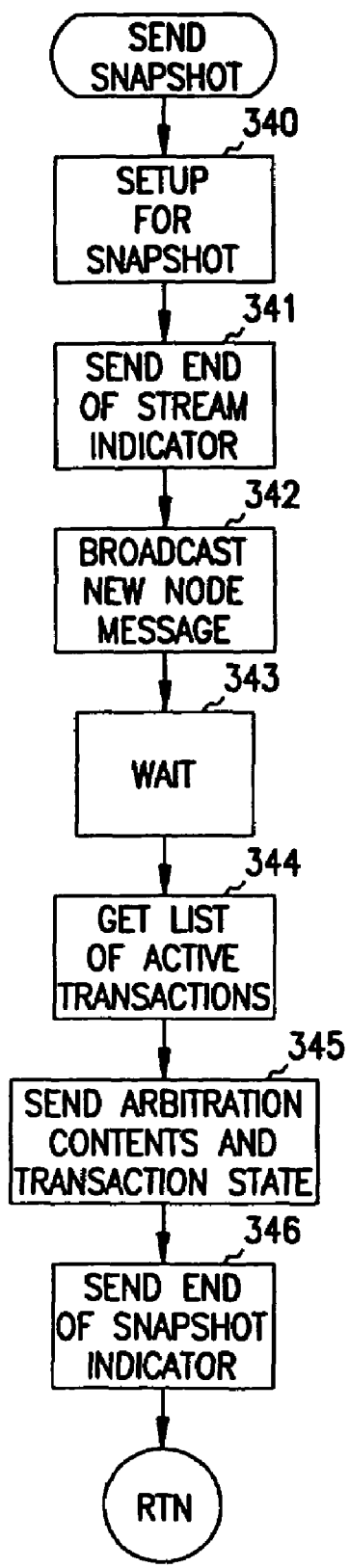

The snapshot process is shown in FIG. 3E. At block 340, the synchronization thread sets up a variety of temporary data structures in preparation for creating and sending the snapshot. In one exemplary embodiment, a semaphore data structure ("mutex") is used to allow only one snapshot to be performed at any time for any given table. All other synchronization threads requesting a snapshot for the table are queued.

The synchronization source thread sends an end of stream indicator to the destination at block 341 to signal that the snapshot data follows. The synchronization source also sends a message to each node that is already caching the table to indicate that the destination node is now caching the table (block 342). This message instructs all nodes caching the table to include the new node as part of any arbitration involving the table.

The synchronization thread waits at block 343 until it receives an acknowledgement from all of the nodes to which the broadcast message was sent. Blocks 342 and 343 establish a point in time after which all transactional changes will end up at the destination node since, after block 343, any record changes will be arbitrated and these arbitrations will include the destination node. Therefore any new transactions started after block 343 do not need to be snapshot. The synchronization thread sends a list of nodes that are caching the table to the destination node to begin the snapshot process.

The synchronization thread now obtains a list of all transactions for the table that are active at this point (block 344). This list of transactions is used both to populate the synchronization snapshot (thus determining the size of the snapshot) and also to hookup transactions as described below in conjunction with FIG. 3G. In one exemplary embodiment, the list of transactions is obtained by iterating through a transaction data structure and including any transaction involving the table that is neither committed nor aborted.

In the object-oriented embodiment described above, each transaction object points to the set of arbitration objects that control changes belonging to that transaction. An arbitration object is associated with a record in a table and controls arbitration cycles for that record. Note that an arbitration object can describe multiple changes to the record from several different transactions and in that case, the arbitration object for that record is pointed by all the corresponding transaction objects. For each active transaction on the table, the synchronization thread on the source node sends the contents of the arbitration object for the table and the state of the transaction object to the destination node at block 345. The arbitration object contents comprises all proposals and closure messages; the transaction state comprises all uncommitted changes for the table.

The synchronization thread sends an end of snapshot indicator to the destination node in the synchronization data stream at block 346.

Figure 3F:
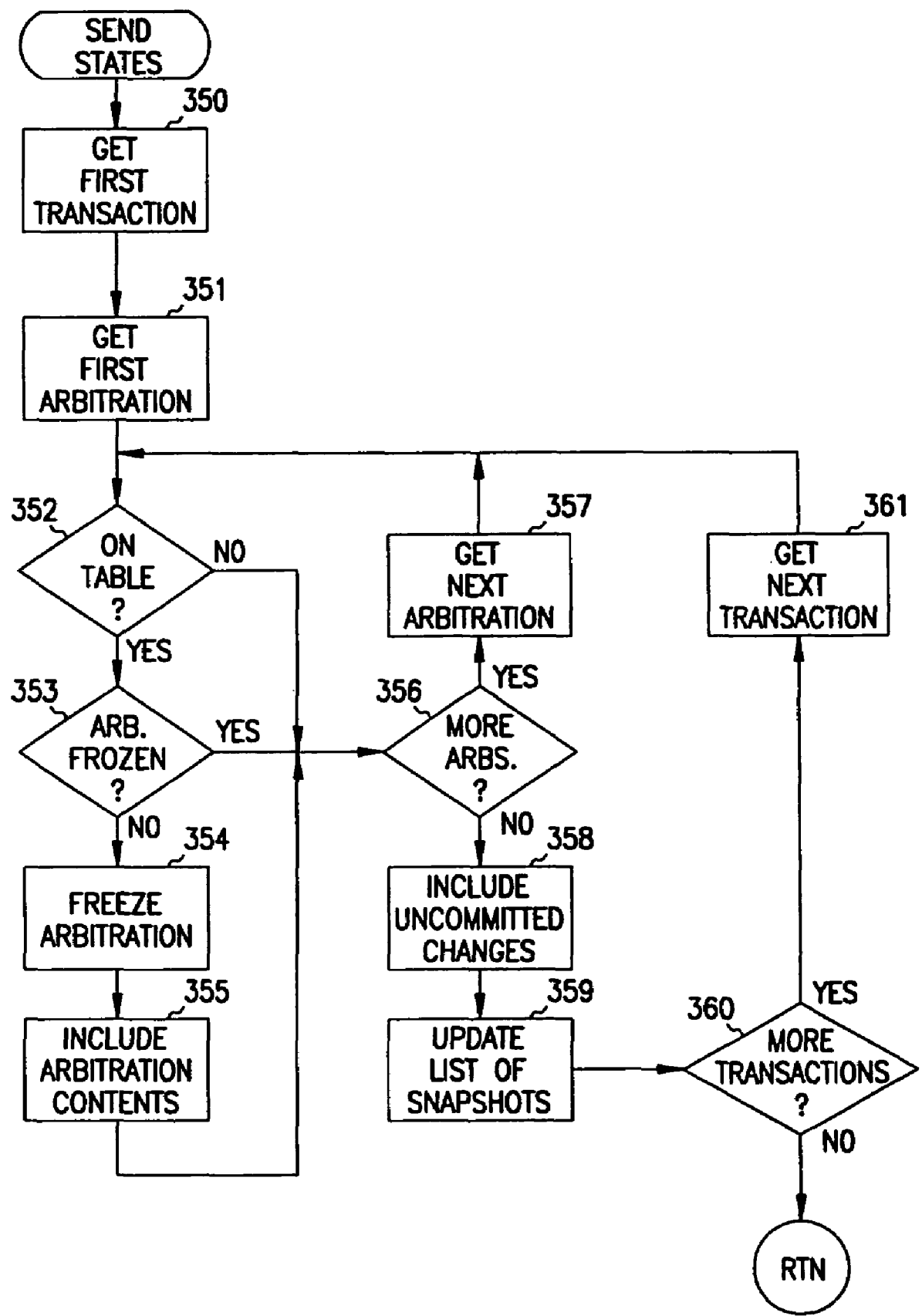

The processing in block 345 of FIG. 3E is now described with reference to FIG. 3F. Each transaction has an uncommitted change data structure that describes the uncommitted changes that have been performed by that transaction. The source node uses the uncommitted change data structure to isolate changes made by an uncommitted transaction from other transactions. The information in the uncommitted change data structure is used to apply the changes to the table(s) when the transaction commits. If the transaction aborts, the change information in the uncommitted-change data structure is discarded. Although these objects and data structures are used to describe the process illustrated in FIG. 3F, the invention is not so limited as one skilled in the art will immediately perceive of alternate embodiments that achieve the same results using analogous entities.

During the snapshot, arbitrations that on records in the table being synchronized are frozen on the synchronization source. A frozen arbitration is one where no other related proposals (i.e., changes to the record described by the arbitration) are executed. Arbitrations are frozen for the duration of the snapshot to insure that no further changes occur to the record described by the arbitration and therefore a consistent snapshot of the transaction state can be obtained.

The synchronization thread begins by getting the first transaction that is active at block 350. The thread obtains the first arbitration that is in process for that transaction at block 351. The synchronization thread then determines whether the arbitration that is in process for the active transaction involves the table that is being synchronized to the destination node (block 352). If it is, the synchronization thread next checks to determine whether the arbitration has already been frozen at block 353. If not, synchronization thread sets the state of the corresponding arbitration object to ArbFrozenForSnapshot, which freezes the arbitration (block 354), and includes the arbitration contents in the data to be sent to the destination node (block 355). From this point on, no new proposals for that arbitration will be executed. If there is a currently executing proposal, it continues processing.

The synchronization thread determines whether additional arbitrations are active (block 356) and if so, it obtains the next active arbitration (block 357) and proceeds to loop through the process again, beginning at block 352. If there are no more arbitrations for this transaction (block 356), the synchronization thread next includes in the snapshot data any uncommitted changes for the arbitration(s) that are now frozen (block 358). The uncommitted changes are determined by iterating through the uncommitted change data structure. For each record that is modified in the table being synchronized, the change described by the uncommitted change data structure is included in the snapshot. The synchronization thread holds a lock on the uncommitted change data structure to prevent any further changes from being added to the data structure and also to prevent the transaction from committing or aborting. Note that changes can be added to the uncommitted change data structure after the thread has finished enumerating it. However, any such change is a result of a currently executing non-expedited proposal completing its execution. No other proposals can be started during the period in which arbitrations are frozen.

In one exemplary embodiment of the process represented by block 358, as each uncommitted change is read from the uncommitted change structure, it is queued on the queue of committed changes instead of being immediately placed in the snapshot. This permits a faster enumeration of the uncommitted change data structure so that the synchronization thread holds the lock for a shorter period of time and thus, the throughput of the transaction associated with the uncommitted change data structure is improved. The uncommitted changes are then sent to the destination node interspersed with the committed changes at block 347 in FIG. 3E.

The synchronization thread now updates the list of snapshots that concern the transaction at block 359. In one exemplary embodiment, an identifier for the table is added to a list associated with the transaction. If a particular table identifier is in this list, the transaction is deemed part of the snapshot for that table. The synchronization thread checks for additional active transactions at block 360. If there are additional active transactions, the synchronization thread obtains the next transaction at block 361 and proceeds to block 352. If there are no more active transactions, the snapshot data is complete.

Figure 3G:
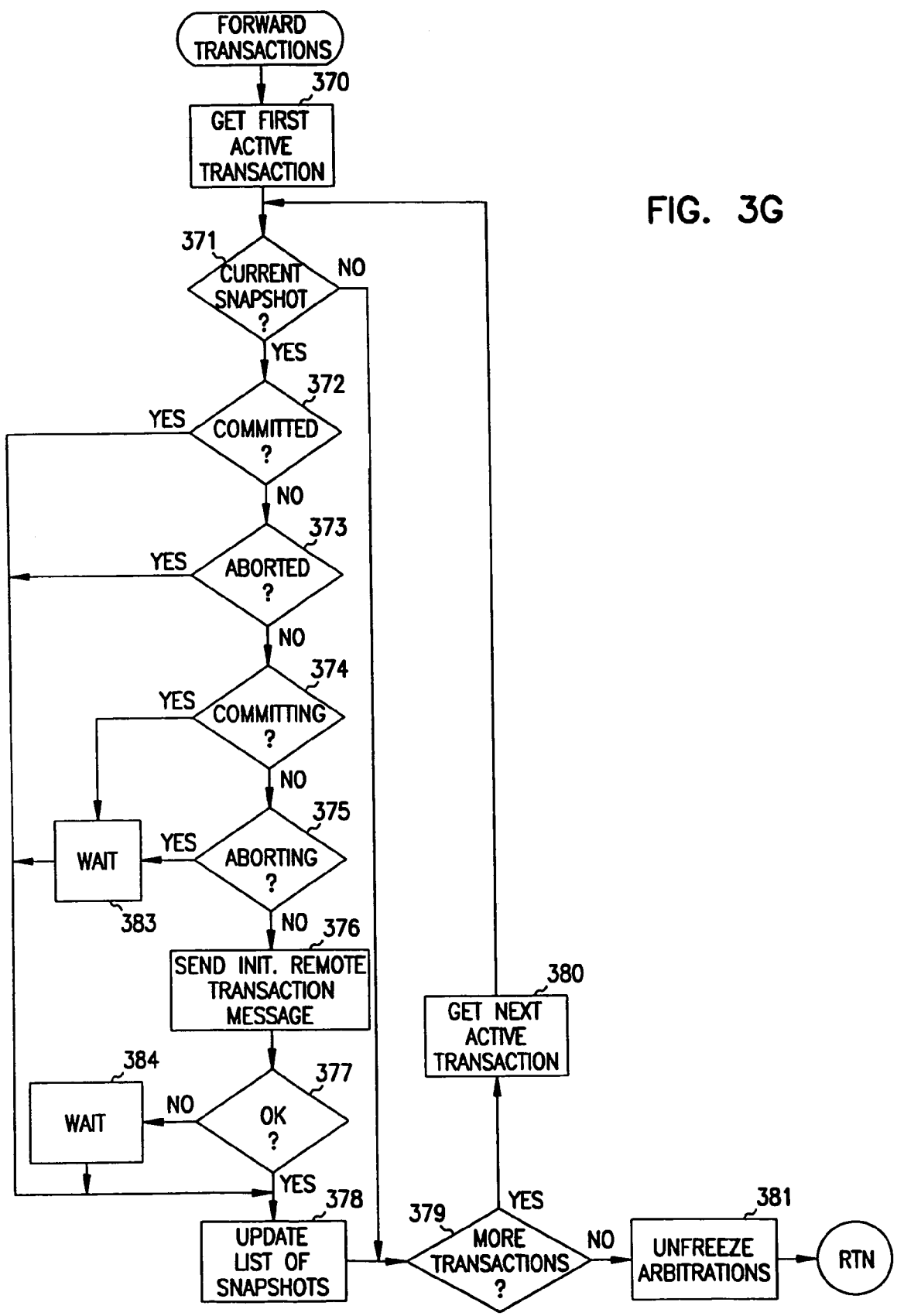

FIG. 3G details the processes that are performed at block 307 in FIG. 3A to forward active transactions to the destination node when the source node has received an end of snapshot response message. At block 370, the synchronization thread gets the first transaction in the list of active transactions. The synchronization thread evaluates the active transaction to determine if it is part of the current snapshot (block 371), whether it is a committed transaction (block 372), an aborted transaction (block 373), a committing transaction (block 374) or an aborting transaction (block 375). If the active transaction is not part of the current snapshot then the synchronization thread will determine if additional transactions exist (block 379). If so, it will get the next active transaction at block 380 and proceed to evaluate the transaction starting with block 371.

If the active transaction is a committed or aborted transaction, the synchronization thread updates the list of snapshots associated with the transaction at block 378 to indicate that the snapshot is no longer associated with the transaction. In the exemplary embodiment described previously, this is accomplished by removing the table identifier from the list for the transaction. If the transaction is part of current snapshot and is in the process of committing or aborting, the synchronization thread waits until the committed or aborting process is completed (block 383) and then updates the list of snapshots at block 378. This ensures that all committed changes for the transaction reach the destination before the synchronization is complete.

If the next active transaction is part of the current snapshot and is neither committed nor aborted, nor is in the processes of committing or aborting, the synchronization thread sends an initialize remote transaction message to the destination node at block 376 and waits for an initialize remote transaction response message. If the response is that the destination node was able to initialize the remote transaction (block 377), the synchronization thread proceeds to block 378. If not, the synchronization thread waits (block 384) because the destination node was already in the process of committing or aborting the transaction due to information it had received external from the synchronization thread, i.e., through one of the other nodes in the network or through DTC. Under these circumstances, the synchronization source node will also be committing or aborting the transaction shortly, and therefore the synchronization thread waits until the process is completed on the synchronization source.

Upon completion of the processing for the active transaction, the synchronization thread updates the list of snapshots associated with the transaction (block 378). The synchronization thread now determines if there are more active transactions. If there are, the thread proceeds to evaluate the next active transaction. If there are no more active transactions (block 379), the synchronization thread unfreezes all arbitrations associated with the table being snapshot (block 381), allowing activity to proceed on the table.

Figure 3H:
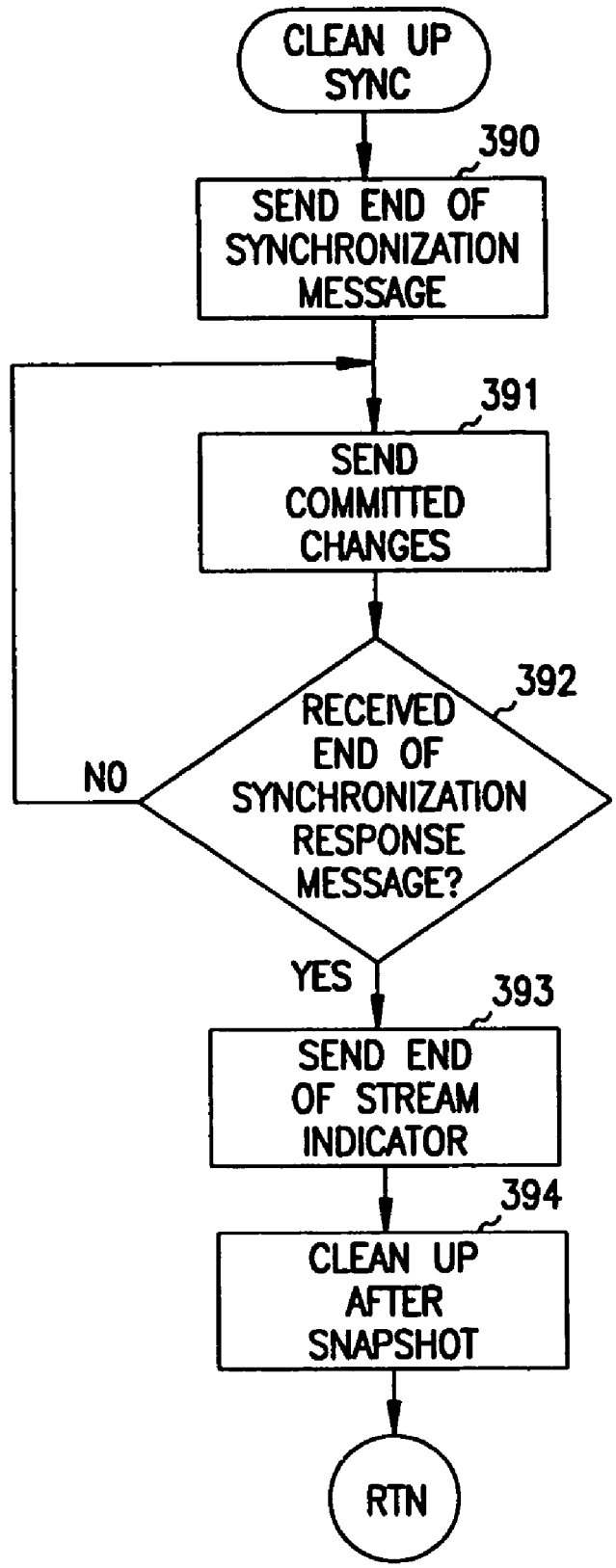

Once all the active transaction have been forwarded to the destination node, the synchronization thread performs the processes illustrated in FIG. 3H (corresponding to block 308 in FIG. 3A) to complete the synchronization process. The synchronization thread sends an end of synchronization message (block 390) to the destination node to inform the destination node that all active transactions have been forwarded. The synchronization thread continues to monitor the queue of committed changes and periodically sends committed changes on the queue to the destination node (block 391) until it receives a response to the end of synchronization message (block 392) from the destination node. When the end of synchronization response message is received, the synchronization thread places an end of stream indicator in the synchronization stream after the last committed change (block 393), and cleans up all temporary data structures associated with the snapshot and the synchronization process (block 394). In the embodiment in which a mutex is used, it is released as part of the clean up process.

As the synchronization source is synchronizing the table on the destination node, both local and distributed transactions on the table can be committed or aborted on the synchronization source node in an asynchronous manner. FIG. 4A illustrates an exemplary embodiment of a method performed by the synchronization source node to propagate any changes to the table made by committed transactions. The method relies on the regular commit process provided by the underlying database management system executing on the source node but implements enhancements to the process. In the particular embodiment illustrated in FIG. 4A, a commit thread on the synchronization source node performs a commit notification process and a snapshot checking process as described below in conjunction with FIGS. 4B and 4C, respectively.

The commit thread iterates through the uncommitted change data structure (block 401) and evaluates the change being committed (block 402) to determine if the change is an insertion of a new record, a deletion of and existing record, or the modification to non-key data in an existing record. Note that in the present exemplary embodiment, when a primary key is modified, the transaction manager creates two changes, a deletion of the existing record and an insertion of a new record with the modified primary key, to guarantee that the order of the modification is the same on all nodes caching the table. If the change is a delete of an existing record (block 403), then the commit notification process at block 404 is performed before the standard commit processing frees up the original record and thus frees up the original key. Once the standard commit processing is completed at block 405, the commit thread determines if the change is an insert of a new record (block 406) or a modification of an existing record (block 407). If either is true, the commit notification process at block 408 is performed.

The commit notification processing at blocks 404 and 408 is illustrated in FIG. 4B. Because transaction commits on the synchronization source node occur asynchronously with the synchronization process and because it is possible for multiple transactions to commit in parallel, the synchronization source maintains certain changes on the queue of committed changes, rather than immediately including them in the synchronization stream. The entries on the queue of committed changes are interspersed with the table data and snapshot data transmitted to the destination node as described above.

The commit notification process first determines if the node is serving as a synchronization source node for the particular table that is being changed (block 420). If it is, the commit thread must determine if the change applies to data already sent to the destination node or to data that has yet to be sent to the destination node. If the primary key of the record being committed is greater than that of the last record sent to the destination node, the change is not queued because the record itself will appear (or not appear, in the case of a delete) later in the synchronization stream of data that is sent to the destination node. If, however, the primary key of the record being committed is less than or equal to that of the last record sent, the change is added to a queue of committed changes for the table at block 422 since the change would not be otherwise reflected in the synchronization stream as the change is out of primary key order.

Returning now to FIG. 4A, once all changes for the transaction have been committed (block 409), the commit thread determines if uncommitted changes for the transaction were sent to the destination node in a snapshot (block 410). Beginning with block 440 in FIG. 4C, the commit thread again determines if the node is synchronizing the table. If so, the commit thread reviews the list of snapshots (block 441). If the transaction was snapshot, the commit thread sends an end of snapshot transaction message to the destination node (block 442). The end of snapshot transaction message contains the transaction identifier and the outcome of the transaction. When the snapshot checking process is called as part of the commit processing for a transaction, the end of snapshot transaction message indicates that the transaction committed.

The snapshot checking process shown in FIG. 4C is also called when a transaction aborts. In this case, the end of snapshot transaction message informs the destination node that the transaction aborted.

As mentioned above, the synchronization thread on the source node uses a special locking protocol to prevent conflicts between itself and any commit thread. The commit notification process shown in FIG. 4B uses the key of the last record sent to the destination node as the determinant of whether a committed change needs to be sent to the destination node or not. However there is no straightforward way to synchronize threads doing commit with synchronization threads, i.e., it takes time to commit the transaction and there is also elapsed time between the time a record is read by the synchronization thread and sent in the data stream. To illustrate a conflict that could arise without the use of the synchronization lock, suppose the synchronization thread reads a record and simultaneously with reading that record, the commit thread tries committing an inserted record whose key is between the last key sent to the destination and the key that was just read. The synchronization thread has not yet recorded the key value of the key just read as the last key sent by the because the record has not been sent to the destination node at this point. As a result the commit notification process will determine that the newly committed inserted record occurs after the last key read and not send it to the destination node. Since the next record to be sent has a key greater than the key of the inserted record the inserted record is never sent to the destination node and is thereby lost.

Instead the synchronization thread acquires a synchronization lock on the primary key when reading a record, and holds that lock until the record has been sent to the destination node as explained above. The synchronization lock has the following characteristics.

It conflicts with any committed lock. A committed lock is a lock that is taken just prior to doing commit processing. Therefore if the synchronization thread is trying to get a synchronization lock on a key for a record whose change is being committed, the synchronization thread will wait for the commit to complete. Similarly if the synchronization thread holds a synchronization lock on a key and a transaction tries escalating a lock on that same key to a committed lock (which always happens prior to commit), then the transaction will wait until the synchronization lock is dropped (i.e., until the synchronization thread has written the change to the destination).

It also conflicts with an Intent-Insert (II) lock. An II lock is used to guarantee the Serializable isolation level that is a common feature of current database transaction managers. Whenever inserting a key, the transaction will temporarily acquire an II lock on the next key. If that key has a serial-read or synchronization lock then the insert will be blocked. In the case of serializable transactions, this prevents a key from being inserted between two other keys that have been read (causing phantom inserts). In the case of synchronization, it delays the insert of a key just before the key about to be written to the destination node until after the key is written to the destination and therefore the insert will have a key that is less than the highest key written to the destination. The commit notification processing will then determine that the insert should be sent to the destination as a committed change.

Destination Node Methods

Figure 5A:
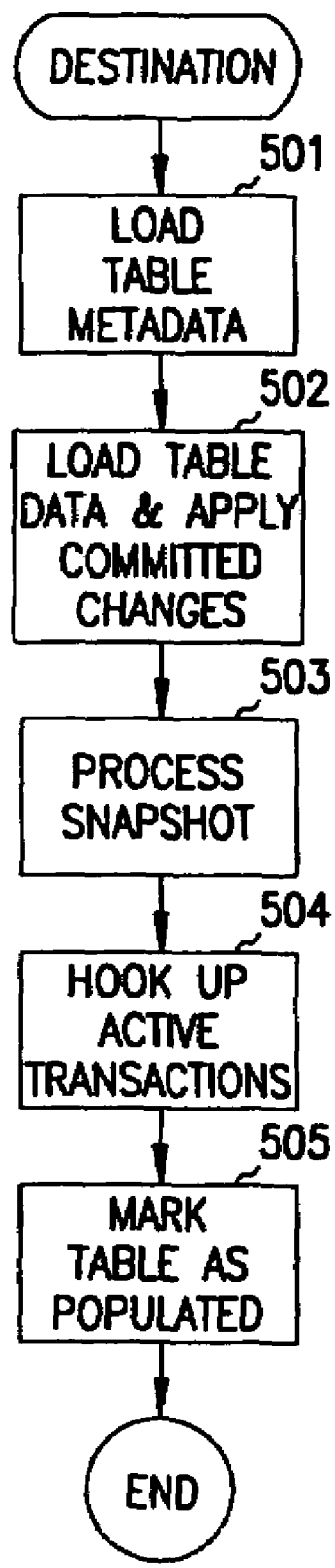
FIG. 5A is a flowchart of a method to be performed by a destination node to create a table from a synchronization stream.

Turning now to the processing on the destination node, FIG. 5A illustrates an exemplary embodiment of a method performed by the destination node when receiving the synchronization stream from the synchronization node. The destination node expects the synchronization stream to have the metadata first, then the table data, and then the snapshot data. Similarly to the source node, the destination node creates a synchronization thread for each table it is synchronizing from a source node.

The metadata is loaded into the appropriate system tables through a transaction executed by the synchronization thread at block 501. Once the metadata is loaded, the synchronization thread begins loading the table data as it is received in the synchronization stream (block 502). In one exemplary embodiment, the table data is in the form of table records, which are loaded by invoking a standard database insert process that adds the data into the table and indexes the key values. The processing at block 502 also keeps track of the number of new records that are inserted in the table and awakens any downstream synchronization threads that are sleeping while waiting on new data. Interspersed among the table data in the synchronization stream are committed changes. As part of the processing at block 502, each committed change is executed in its own transaction that performs the operation described by the change and then commits.

Figure 5B:
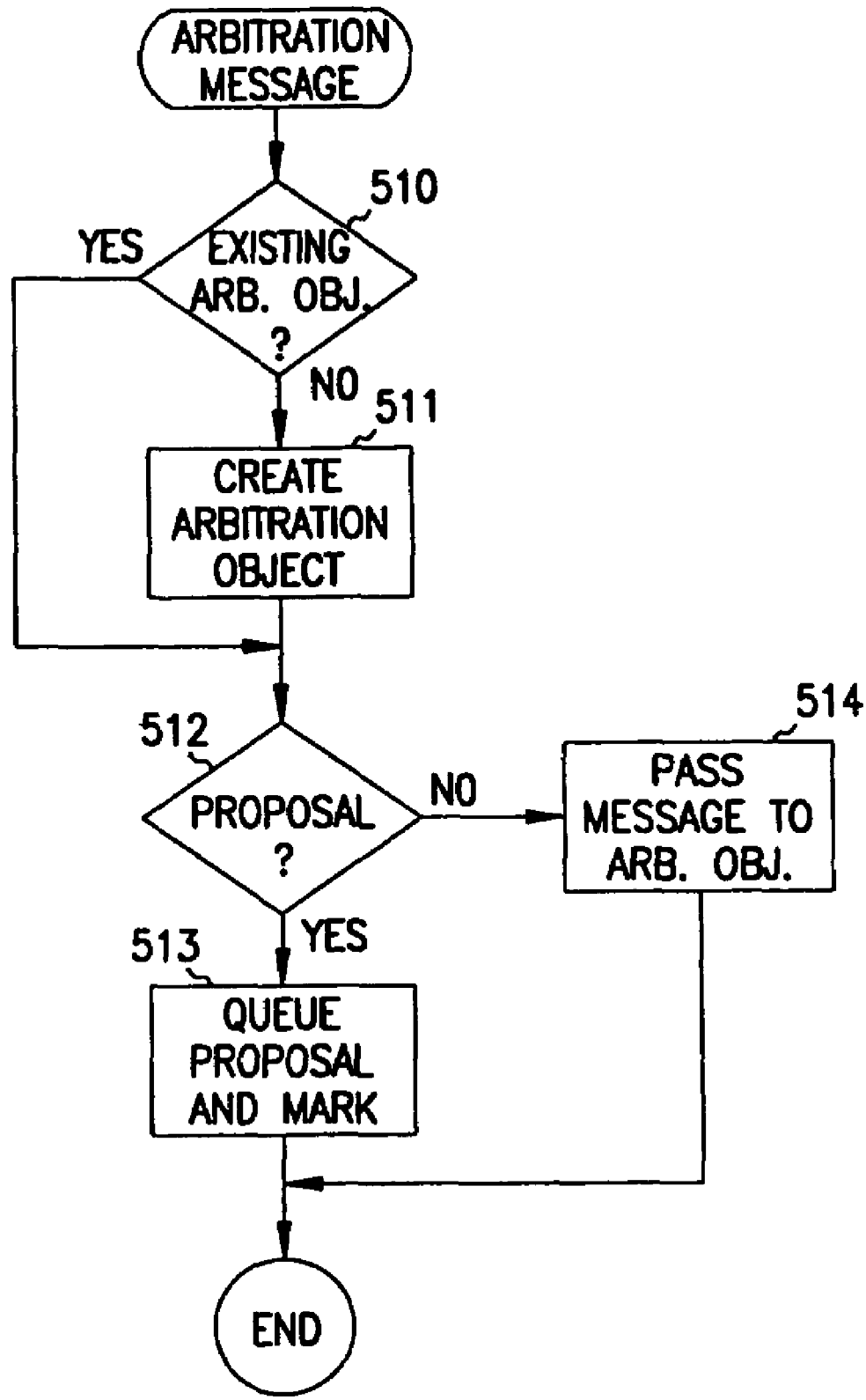
FIGS. 5B, C, D, E, and F are flowcharts illustrating details of the method of FIG. 5A.

After it has received the first end of stream message, the destination node can receive arbitration messages for the table being synchronized from other nodes because the node is now included in the coherent cache as described above. FIG. 5B illustrates the handling of such arbitration messages.

The destination node first determines if there is an arbitration object for the particular record (block 510) and creates one if there is not (block 511); the state of the arbitration object is set to ArbWaitingForSnapshot. If the incoming message is a proposal (block 512), the proposal is added to a pre-arbitration queue and marked as "not responded to" (block 513). Responses to these proposals are send after the snapshot processing is complete. This prevents any further changes from being made to the table until the snapshot is complete. The processing at block 513 also scans the queue to determines if the newly-added proposal is a duplicate and removes it from the queue if it is. A closure message is passed to the arbitration object (block 514), where it is queued at the top of the pre-arbitration queue after deleting any duplicate closure message already on the queue.

Figure 5C:
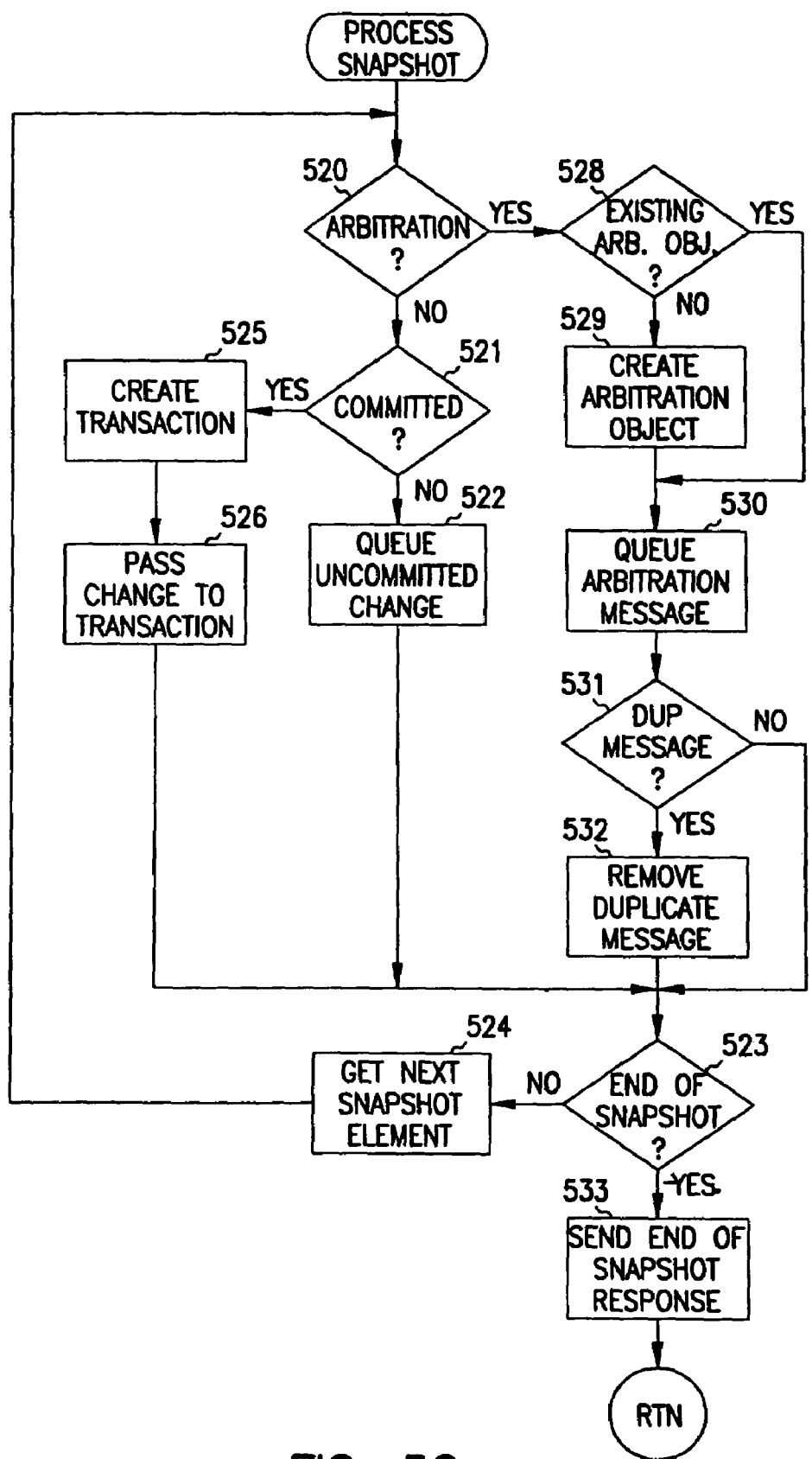
Figure 5D:
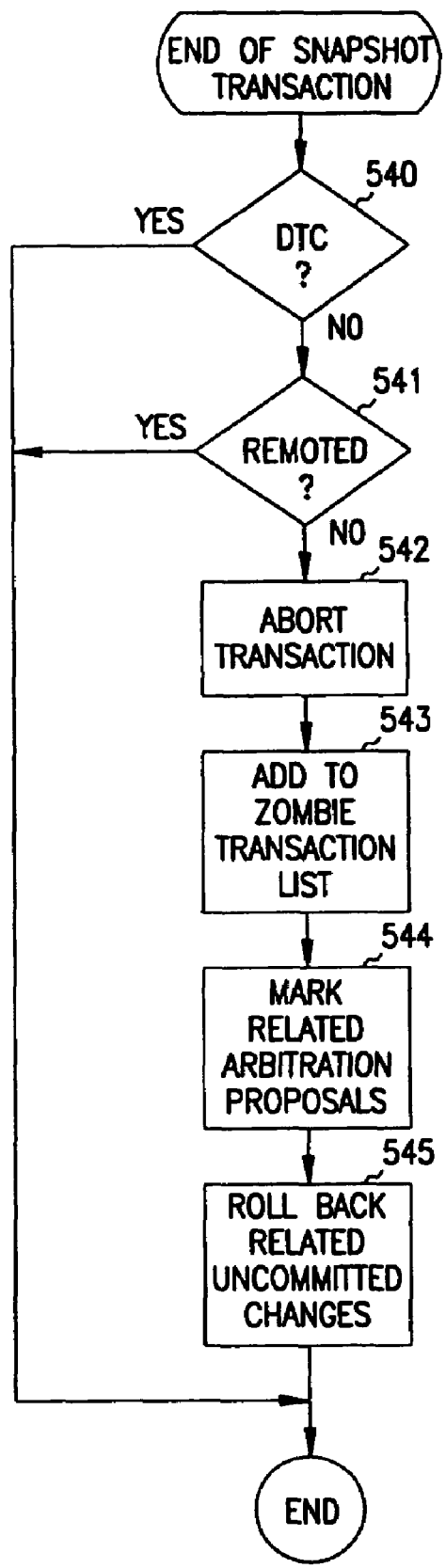

When the snapshot data arrives in the synchronization data stream, it is processed at block 503 as shown in FIG. 5C. If an arbitration message is included in the snapshot ("marshaled") (block 520), the synchronization thread creates an arbitration object and sets its state to ArbWaitingForSnapshot if an arbitration object does not exist for the record (block 528), and then adds the arbitration message to the pre-arbitration queue (block 530). If a duplicate of the message occurs in the pre-arbitration queue (block 531), the duplicate message is removed from the queue (block 532).

If the data in the snapshot is for an uncommitted change on the source node (block 521), the uncommitted change is added to the uncommitted change data structure for the transaction on the destination node and marked as belonging to a snapshot (block 522). The destination node maintains a list of "zombie" transactions, which are transactions that have been aborted as a result of receiving an end of snapshot transaction message (as discussed below in conjunction with FIG. 5D). Since the zombie transaction is aborted it is not possible to add any additional uncommitted changes to the transaction if they are later received as part of the snapshot and so such changes are discarded at block 522.

If the data in the snapshot is for a committed change on the source node, a transaction to apply the change on the destination node is created (block 525). The committed change is passed to the transaction (block 526), which will apply the change to the table and then commit it.

The process of block 503 continues until the destination node receives an end of snapshot indicator (block 523). At that point, the destination node replies with an end of snapshot response message (block 533) and continues processing at block 504 in FIG. 5A. The zombie transaction list is also deleted at block 533.

While still processing the snapshot, the destination node will receive an end of snapshot transaction message from the source node for any transaction that the source node aborts or commits and is part of the snapshot as described above in conjunction with FIG. 4C. Upon receipt of an end of snapshot transaction message, the destination node determines if the commit or abort is for a DTC transaction (block 540), or for a transaction that is already being remoted on the destination node from a third node and was also forwarded by the source node (block 541). If so, then the destination node will receive an commit or abort notification from either the DTC or from the third node, and therefore ignores the end of snapshot transaction message from the source node. The changes in the uncommitted change data structure will be discarded when the commit or abort notification is received as discussed below in conjunction with FIG. 5E. Because of the asynchronous nature of commit processing in a distributed transaction environment, it is possible that the destination node will receive a commit or abort notification for a transaction from DTC or third node prior to the source node sending the end of snapshot transaction message so the end of snapshot transaction message is superfluous.

If neither is true, the end of snapshot transaction message is the only notification that a local transaction on the source node has completed and that the destination node can discard the corresponding transaction state because it will receive any committed changes from the synchronization source later in the data stream as discussed above in conjunction with FIG. 3E. Therefore, the snapshot transaction is aborted on the destination node (block 542). Since the destination node receives snapshot data through the data stream and messages through the regular message channel it is possible that the destination node could receive an end of snapshot transaction message prior to getting uncommitted changes for that transaction as part of the snapshot data. To prevent the destination node from creating a new copy of the aborted transaction in response to later receiving the snapshot data, the destination node adds the aborted transaction onto the zombie transaction list (block 543).

The destination node also removes any data received as part of the snapshot that belongs to the transaction as follows. All arbitration objects belonging to the transaction are evaluated to locate proposals belonging to that transaction. Any such proposal is marked as "execution disabled" to prevent the proposal from being executed, although the proposal is retained to ensure correct completion of the arbitration cycle (block 544). The destination node also examines the uncommitted change data structure for any changes that are marked as snapshot changes. These changes are rolled back (block 545).

As described above, the source node sends an end of snapshot indicator to the destination node when the source has finished sending all the data for the snapshot. The destination node sends an end of snapshot response message to the source node when the destination has finished processing all the data included in the snapshot at block 503 in FIG. 5A.

Figure 5E:
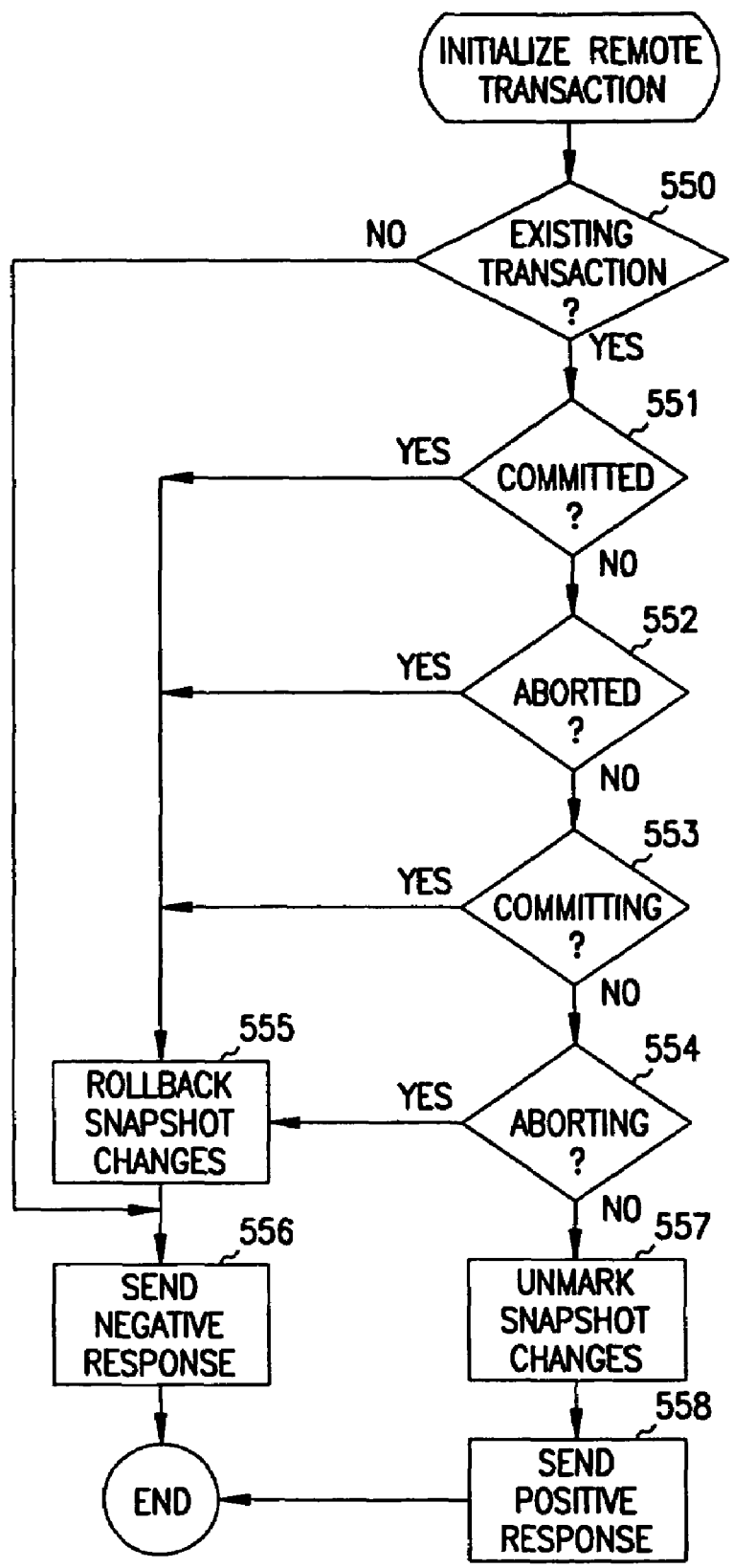

An initialize remote transaction message received from the source causes the destination node to hook up the active transaction specified in the message (block 504). The details of hooking up the transaction are shown in FIG. 5E. For each initialize remote transaction message, the destination node determines if the transaction corresponding to the message exists on the destination node (block 550). If not, then the transaction has already committed or aborted on the destination node, i.e., the destination node received a commit or abort notification for the transaction from DTC or a third node, and the destination node sends a negative response message (block 556).

If the transaction does exist on the destination node, the destination node determines if the transaction is committed (block 551), aborted (block 552), or in the process of committing (block 553) or aborting (block 554). If so, the destination node rolls back any changes in the uncommitted change data structure for the transaction that are marked as originating in a snapshot (block 555), and responds with a negative response message at block 556.

Otherwise, the destination node iterates through the uncommitted change data structure for the transaction and unmarks all snapshot changes (block 557). These changes are used if the transaction commits because the destination node longer receives committed changes for the transaction from the source node at this point. A positive response is sent to the source node (block 558).

Figure 5F:
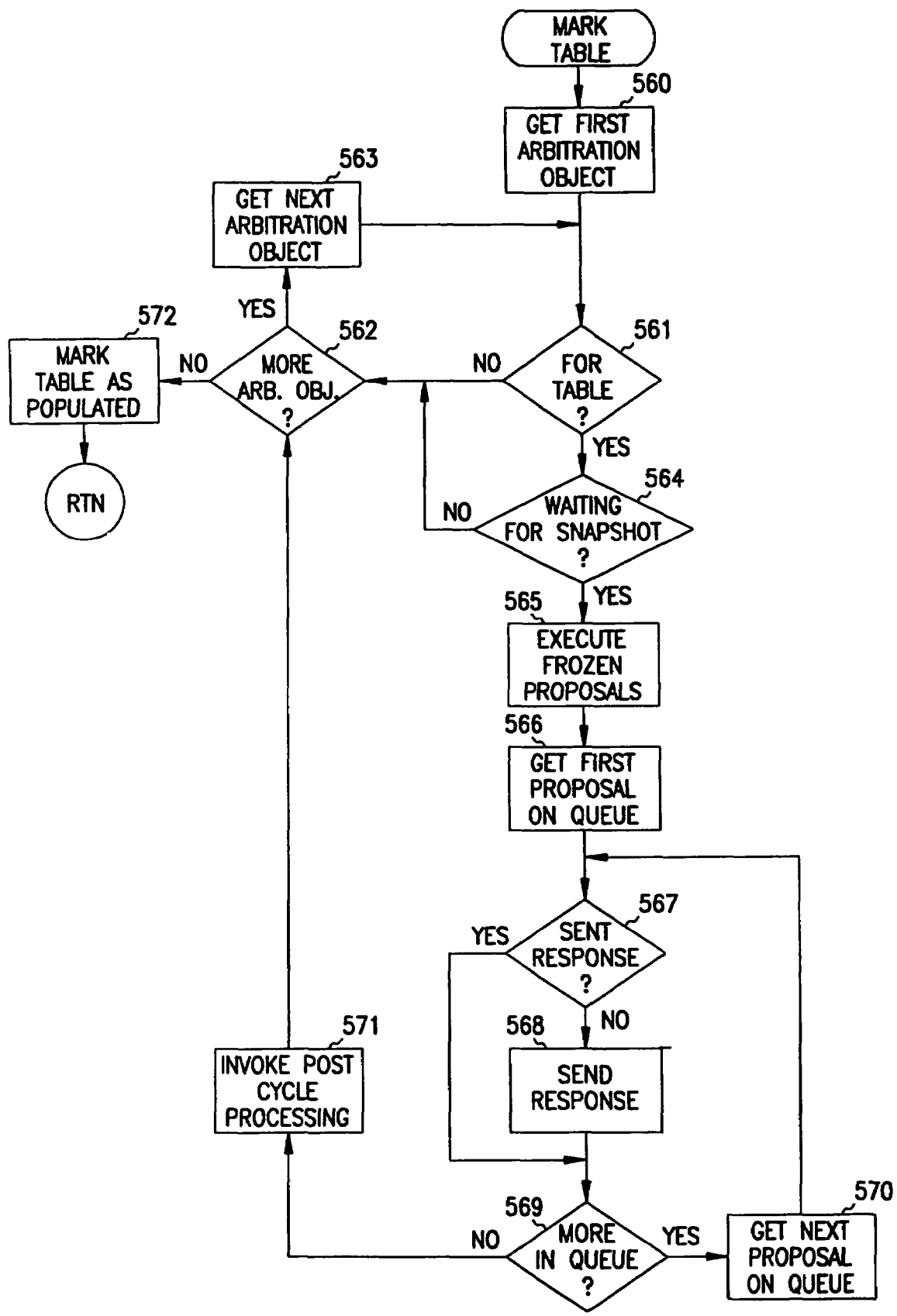

Once all active transactions have been hooked up, the destination node performs the processing at block 505 in FIG. 5A that results in the table being marked as populated and released for use as illustrated in FIG. 5F.

The destination node iterates through its arbitration objects (blocks 560-563). If an arbitration object involves the table being synchronized (block 561) and the arbitration object's state is ArbWaitingForSnapshot (block 564), then the arbitration needs to be restarted. The destination node first attempts to execute any proposals sent in the snapshot data that were in the process of being executed on the source node when the arbitration corresponding to the arbitration object was frozen (block 565). Although this can mean executing the same change a second time, either the operation will succeed in reapplying the same change, such as when reapplying changed data, or will fail, such as when attempting to insert or delete a record for the second time, and thus the table data is unaffected by the second change. Next, all proposals on the pre-arbitration queue are examined (blocks 566 and 570) to determine if the destination node had previously sent a response (block 567). If not, the destination node responds to each node that sent a proposal (block 568).

Once responses for all proposals in the queue have been sent (block 569), the state of the arbitration object is set to Idle and post cycle processing is invoked (block 571) as described in the related arbitration patent to restart the arbitration. The processing of arbitration proposals against the corresponding record now proceeds on the destination node. Newly arriving arbitration proposals involving this record will be active immediately on the destination node. Any arbitration cycles that have already been completed on other nodes will be processed based on the set of messages on the pre-arbitration queue on the destination node, and any arbitration cycle in progress will end up in the appropriate state. All transactions involving the table that are active on the other nodes in the coherent cache are also active on the destination node, along with any changes and arbitration cycles involving those transactions. The committed changes for any transaction that completed before this point also have been applied to the table to the destination node. The synchronization on the destination node is now complete—the destination node table with its uncommitted transaction states and arbitration contents is an exact replica of the table on the source node. The destination node marks the table as populated (block 572), allowing applications to read and change data in the table.

The particular methods performed by source and destination nodes of an exemplary embodiment of the invention have been described. The methods performed by the source node have been shown by reference to a series of flowcharts including all the steps from 301 until 394 and from 401 until 442. The methods performed by the destination node have been shown by reference to a series of flowcharts including all the steps from 501 until 572.

IMDB Implementation

In this section of the detailed description, a particular implementation of the invention is described for use with the Microsoft Corporation coherently cached in-memory database (IMDB) system. The coherently cached IMDB enables multiple nodes in a network to coherently cache the same table in memory. The dynamic synchronizing of tables as described above is used to create a copy of an IMDB table on a node joining a coherent cache.

Data Structures and Definitions

In IMDB, all tables are identified by a 6 byte object identifier (OBJID) consisting of a 2 byte database identifier and 4 byte table identifier. The identifiers are the same across all nodes and the mechanism to ensure this is discussed further below. Each node keeps track of the tables that it has in its cache.

Figure 6:
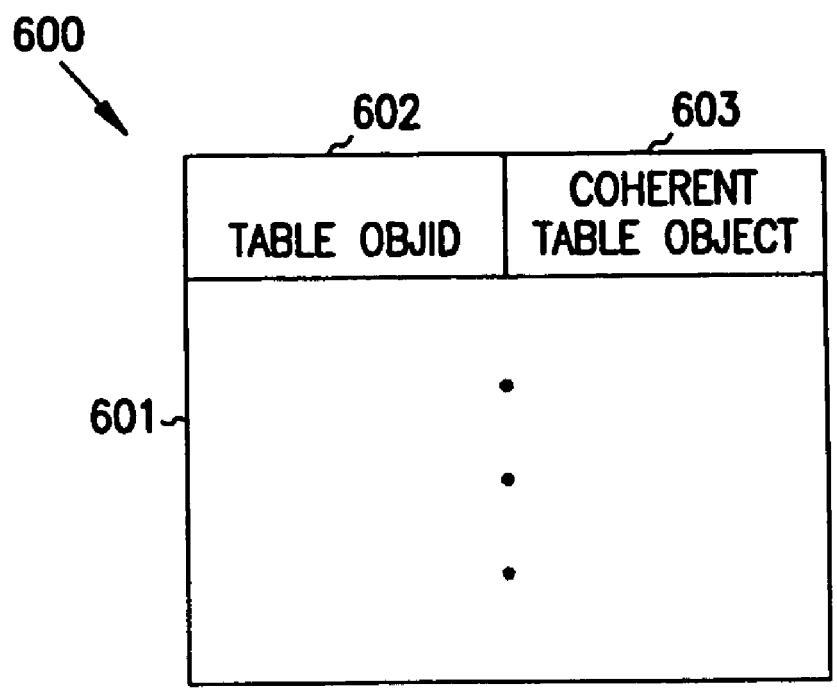
FIG. 6 is a diagram of a node tables data structure for use in an exemplary implementation of the invention.
Figure 7:
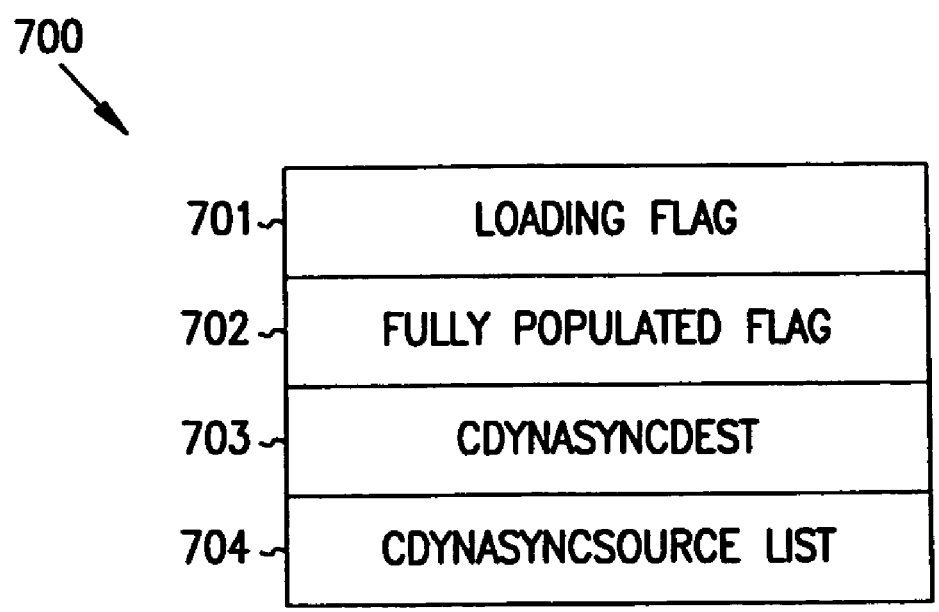
FIG. 7 is a diagram of a coherent table object data structure for use in an exemplary implementation of the invention.

A Node Table table 600 (FIG. 6) contains an entry 601 for each table that maps the table's OBJID 602 to a Coherent Table Object 603 for that table. The table is hashed on the OBJID 602. Among other things, the Coherent Table Object 700, as illustrated in FIG. 7, contains the following information:

Is the node loading the table from the backend database? (loading flag 701)

Is the table fully loaded? (fully populated flag 702)

Is the node in the process of synchronizing the table from another node? If so, the synchronization destination data structures (CDynaSyncDest) 703 used to perform the operation are stored in the Coherent Table Object.

Is the node acting as a synchronization source for one or more nodes? If so, each destination node 705 is represented by an object in a list (CDynaSyncSource List) 705 maintained in the Coherent Table Object.

Figure 8:
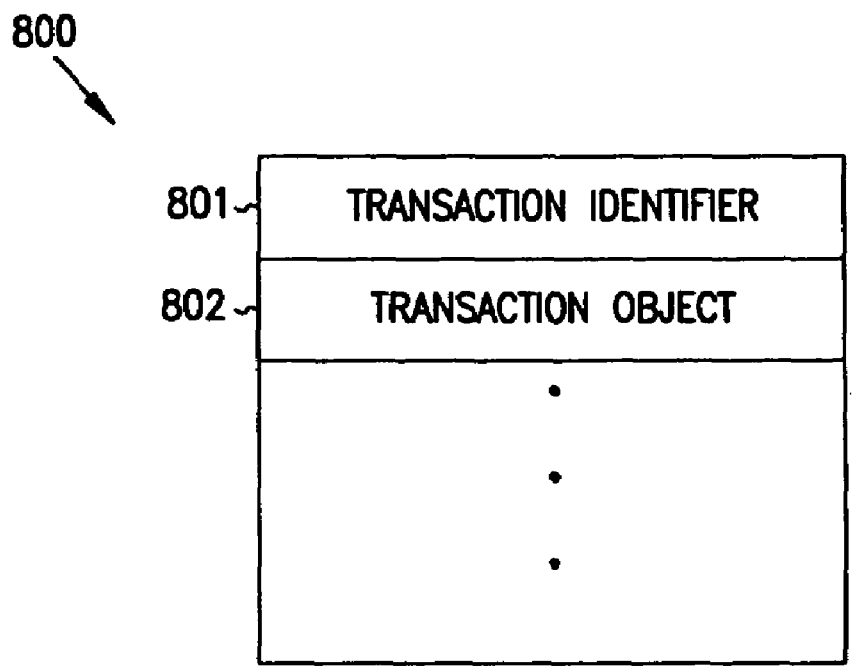
FIG. 8 is a diagram of a node transaction data structure for use in an exemplary implementation of the invention.
Figure 9:
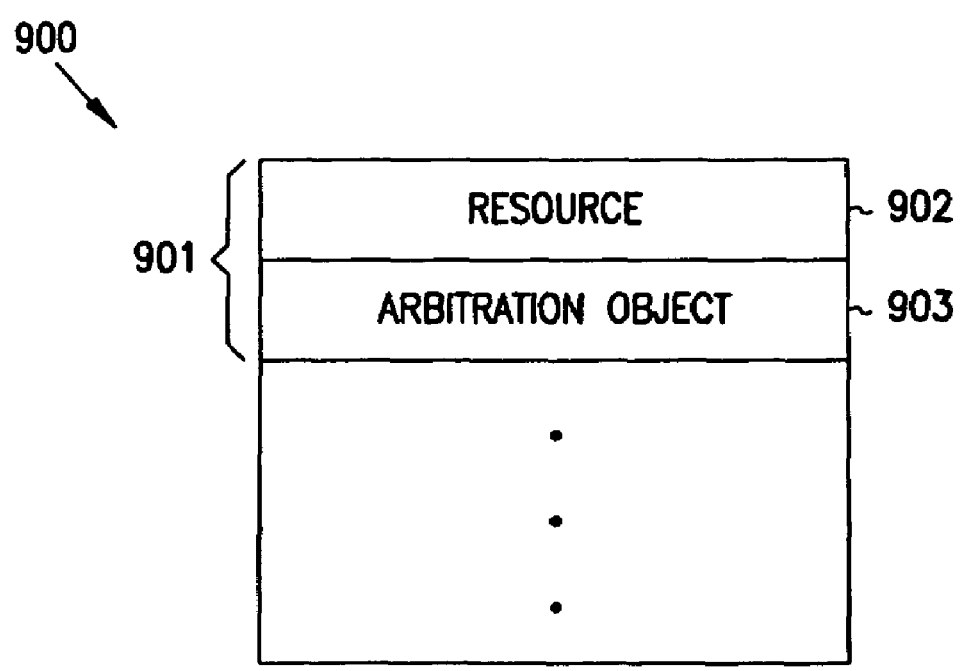
FIG. 9 is a diagram of a node arbitration object data structure for use in an exemplary implementation of the invention.

In addition, a Node Transaction table 800 (FIG. 8) of all transactions executing on a node is hashed on the transaction's identifier 801 (a globally unique identifier known as a "GUID") and contains a transaction object 802 for each transaction. This table is used when iterating through the transactions on a node. A Node Arbitration object table 900 contains an entry for each arbitration object 902, hashed on the resource 901 describing the object being arbitrated, e.g. a table. This table is used when iterating through arbitrations on a node.

In IMDB, a "lookaside" table as described in co-pending U.S. patent application Ser. No. 09/135,917 serves as the uncommitted change data structure. The IMDB lookaside table contains RecordChange records that are used to describe insertions of new records, deletions of existing records, and changes to existing records. The RecordChange lookaside record contains the following fields:

Original Record Id: For newly inserted records, this field is NULL

New Record Id: Identifier for the new copy of the record. For newly inserted records this field is NULL Column Change Bitmap. There is a bit corresponding to each column that is modified in the record. This field is NULL for deletions and insertions.

The RecordChange lookaside record is used in a NotifyRecordChange process on a synchronization source node to determine the type of processing that should be performed when a transaction commits on a table being synchronized. The record identifier of the new record, the original record identifier, and the column change bitmap are passed in as arguments. If the original record identifier is NULL, then the operation is an insert. If the new record identifier is NULL, then the original record is being deleted. If both the original and new record identifiers are non-NULL, the record is being modified.

Because the table identifier is communicated between nodes, the table identifier for a coherently cached table must be the same on all nodes. Two coherently cached metadata tables are used to implement this.

Figure 10:
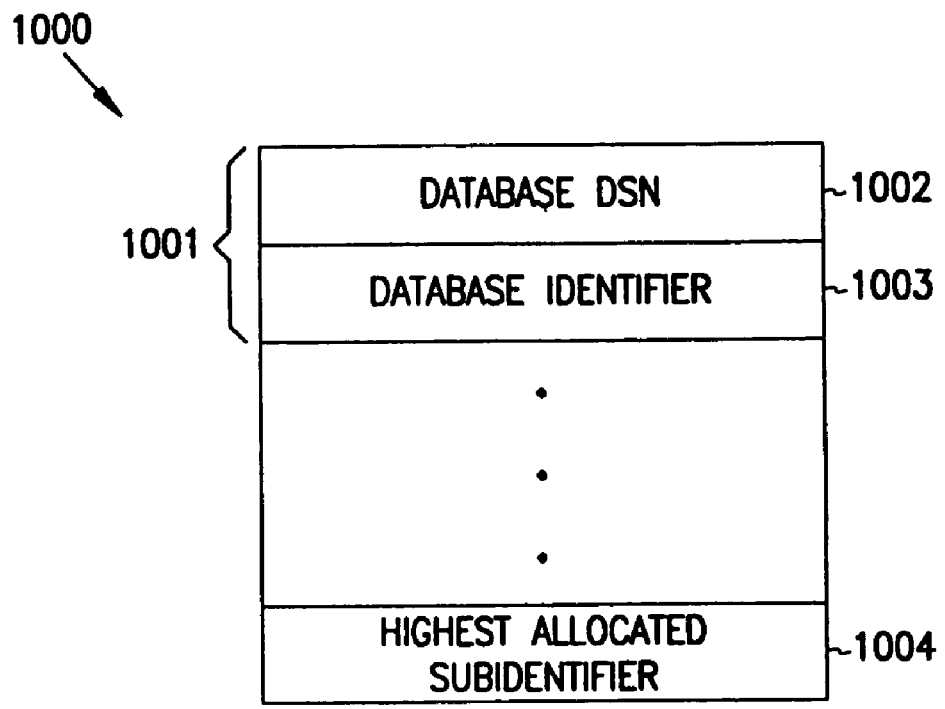
FIG. 10 is a diagram of a coherent databases data structure for use in an exemplary implementation of the invention.

A Coherent Databases table 1000 shown in FIG. 10 contains entries 1001 that map a database 1002 to a database identifier 1003. In IMDB, a database is uniquely identified by a DSN (data source name) that indicates both the location of the database (i.e., which back end server has the database) and the database at that location.

Figure 11:
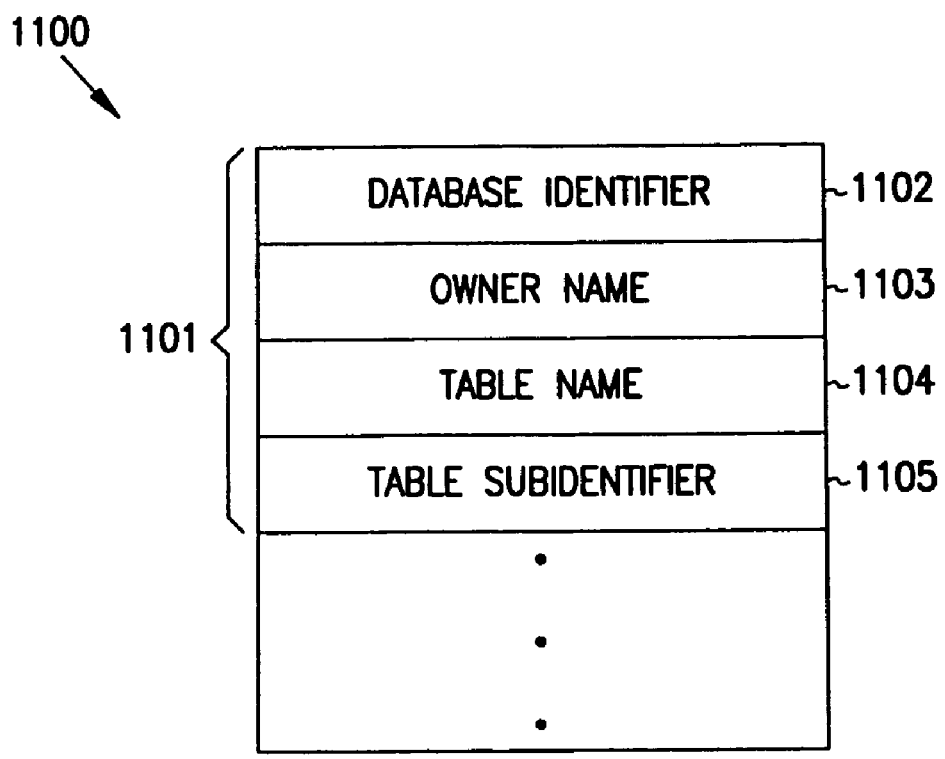
FIG. 11 is a diagram of a coherent tables data structure for use in an exemplary implementation of the invention.

A Coherent Tables table 1100 shown in FIG. 11 contains entries 1101 that map a database identifier 1102, table name 1104 pair to a table subidentifier 1103. The table name 1104 can be combined with the owner name 1103 since many databases support a multi-level naming scheme for tables within databases.

It should be noted that these are the only metadata tables that are coherently cached. All other metadata is manipulated as a result of more global operations such as Synchronize (described above), DropTable (which drops a coherently cached table from the cache), AddIndex (adds an index to a table), and DropIndex (drops an index from a table). The column and index metadata is maintained locally on each node. Note also that when an IMDB node comes on-line, first the Coherent Databases table 1000 is synchronized as described next, and then the Coherent Tables table 1100 is synchronized from another IMDB node in the same fashion as any other coherently cached table. The Coherent Tables table 1100 on the first node to come on-line is empty since there is no other node from which to obtain the data.

In non-coherently cached IMDB, the databases table (corresponding to the Coherent Databases table) is populated from a COM+ (Component Object Model) catalog, which contains a description for each DSN to use within IMDB. In coherently cached IMDB, the COM+ catalog on each node is assumed to contain at least all the DSNs for all coherently cached tables used by group of computers implementing the coherent cache. As each computer comes on-line, it will synchronize the Coherent Databases table 1000. The process is the same for synchronizing this table as for synchronizing any other coherently cached table. The main difference between synchronizing the Coherent Databases table 1000 and a backend table is the Coherent Databases table 1000 is populated from the COM+ catalog rather than from a backend database.

In addition to the database DSN 1002 and the database identifier 1003, the Coherent Databases table 1000 maintains an entry that contains the highest subidentifier 1004 allocated so far. Whenever a new table is added to the coherent cache, a subidentifier must be allocated for it. This is done by incrementing the highest subidentifier for the database. However, since the Coherent Databases table 1000 is cached on multiple nodes, it is possible that several nodes could try to allocate a new subidentifier at the same time. The operation of incrementing the subidentifier is therefore arbitrated. Whenever a node wishes to allocate a new subidentifier, it creates a proposal to do so. If several nodes submit such proposals simultaneously, the arbitration mechanism will order the proposals in the same way on all nodes as explained in the arbitration patent. Processing the proposal is implemented as incrementing the subidentifier. Since the proposals are ordered in the same way on each node, each node will end up with a different identifier and the highest subidentifier allocated will be the same on all nodes at the end of the arbitration cycle.

The Coherent Tables table 1100 entry 1001 contains four fields as described above: database identifier (DBID) 1102, owner name 1103, table name 1104, and subidentifier 1105 for the table. There are two ways that a table is created within a database. In the case of a backend database, tables are loaded when they are requested. For temporary database tables, tables are created via a specific Add Table operation.

Whenever a new table is populated from the backend the first step is to determine if the node has an entry in the Coherent Tables table 1100. If so, the corresponding table subidentifier 1105 is used to identify it. Otherwise, an entry mapping DBID 1102, owner name 1103, and table name 1104 to a table subidentifier 1105 must be created. IMDB fills the Coherent Tables table 1100 with all tables having the same name regardless of the owner. This is done to determine if there are multiple tables with the same table name or whether there is a single table with that table name. This allows the user of IMDB to use the table name without the owner name if the table name is unambiguous. The process of populating the Coherent Tables table 1100 with all tables of a given name must be arbitrated to prevent multiple nodes from doing so simultaneously and is described next.

The arbitration proposal contains the database identifier 1102 and the table name 1104. The table name 1104 is hashed to map the message to an arbitration object using the Node Arbitration Object table 900. The proposal also contains the transaction identifier of the transaction in which the Coherent Tables table 1100 is to be populated. This transaction is created on each computer that sees the proposal. If there are multiple proposals, only the "winner" gets to populate the Coherent Tables table 1100 with the tables of the specified name.

The processing of a remote proposal for this arbitration is now described. If the proposal is from the winner of the arbitration, then executing the proposal means waiting for the transaction for the proposal (identified by the transaction identifier stored in the proposal message) to either commit or abort. If the proposal is not from the winner of the arbitration, then no processing is performed.

The process required to fill the coherent tables table with tables with a specific DBID 1102, table name 1104 pair is as follows:

1. Create a transaction to fill the Coherent Tables table 1100.
2. Create a proposal to populate the table with the DBID 1102, table name 1104 and arbitrate the proposal
3. If this node wins the arbitration, then obtain the list of owner name 1102, table name 1104 pairs for this database for the table name supplied, commit the transaction, and return.
4. If the node does not win the arbitration then the arbitrate operation will not return until the transaction for the winner either commits or aborts. Determine whether the table name appears in the Coherent Tables table 1100. If so, then return; otherwise, the transaction from the winner must have aborted. Retry this operation from step 1.

Since the Coherent Tables table 1100 is coherently cached, all changes to it are arbitrated so that insertions, deletions, and changes to records are replicated automatically across all computers.

Synchronization Stream Data and Message Formats

Most data in the synchronization stream is in the form of records. All records are represented using a 32-bit unsigned integer ("unsigned long") that is the count of bytes containing the record followed by the contents of the record.

The data in the stream consists of the following sequence of records.

1. A set of records representing the column metadata for the table. The set of records is terminated with a record length byte of 0.
2. A set of records representing the index metadata for the table. The set of records is terminated with a record length byte of 0.
3. A set of records representing the index key metadata for the table. The set of records is terminated with a record length byte of 0.
4. A set of records representing the table metadata for the table. The set of records is terminated with a record length byte of 0.
5. The actual data in the stream. The records are sent from the source to the destination in primary key order. A record length byte of 0 is an escape code.
6. The escape code is followed by a control code that is either:
   0, indicating the end of the data records.
   1, indicating that the next set of records is committed changes to the table.
7. The committed changes have the following format.
   An operation header: either Committed Delete, Committed Insert, Committed SetData, or EndOfData
   For Committed Delete, the length of the key followed by the primary key.
   For Committed Insert, the length of the newly inserted record followed by the contents of the newly inserted record.
   For Committed SetData, the length of the key followed by the primary key, the length of the column change bitmap followed by the column change bitmap, the length of the new copy of the record followed by the new copy of the record.
   EndOfData indicates the end of a set of committed changes and the following record is a resumption of the data stream.
8. After the end of data records is read then the snapshot is read. The snapshot begins with a count of the number of remote nodes caching the table associated with the snapshot, followed by an identifier (GUID) for each node. Every block of records in the snapshot begins with an escape code of 0 and a control code of 1. Committed changes can be interspersed with uncommitted changes in the snapshot. An escape code of 0 followed by a control code of 2 indicates the end of the snapshot.
9. Snapshot data can include all of the data in committed changes, i.e., Committed Delete, Committed Insert, Committed SetData, or EndOfData, as well as data records specific to the snapshot: Uncommitted Insert, Uncommitted Delete, Uncommitted SetData, Arbitration, and Start Transaction. Thus, committed changes are interspersed within the snapshot data.

10. The Arbitration snapshot consists of a series of marshaled proposal and closure messages:
    Each message is first identified with its stage in the source arbitration cycle when it was marshaled, i.e., either Pre Arbitration, Current Arbitration, Post Arbitration, Currently Executing, Expedited, Current Closure, or End Of Arbitration.
    Each message is marshaled in the same format as it is sent across the connection between nodes and includes the message and the identifier (GUID) of the node that sent the message.
    End of Arbitration is the last message for a given arbitration.
11. The Transaction Started snapshot consists of the transaction identifier (GUID) and whether the transaction is optimistic or pessimistic. A Transaction Started record precedes any set of uncommitted changes. All the uncommitted changes that occur between two Transaction Started records are associated with the first transaction
12. The format of Uncommitted Insert, Uncommitted SetData, and Uncommitted Delete are identical to their committed counterparts.
13. Once the block of snapshot data is complete there can be additional blocks of data consisting of committed changes. Each such block starts with an escape code of 0 and control code of 1 and ends with an EndOfData record.
14. A final escape code of 0 followed by a control code of 0 indicates the end of the synchronization stream. At this point all committed changes have been sent to the destination node and any active transactions will be initiated on the destination node through the process described above.

Figure 12:
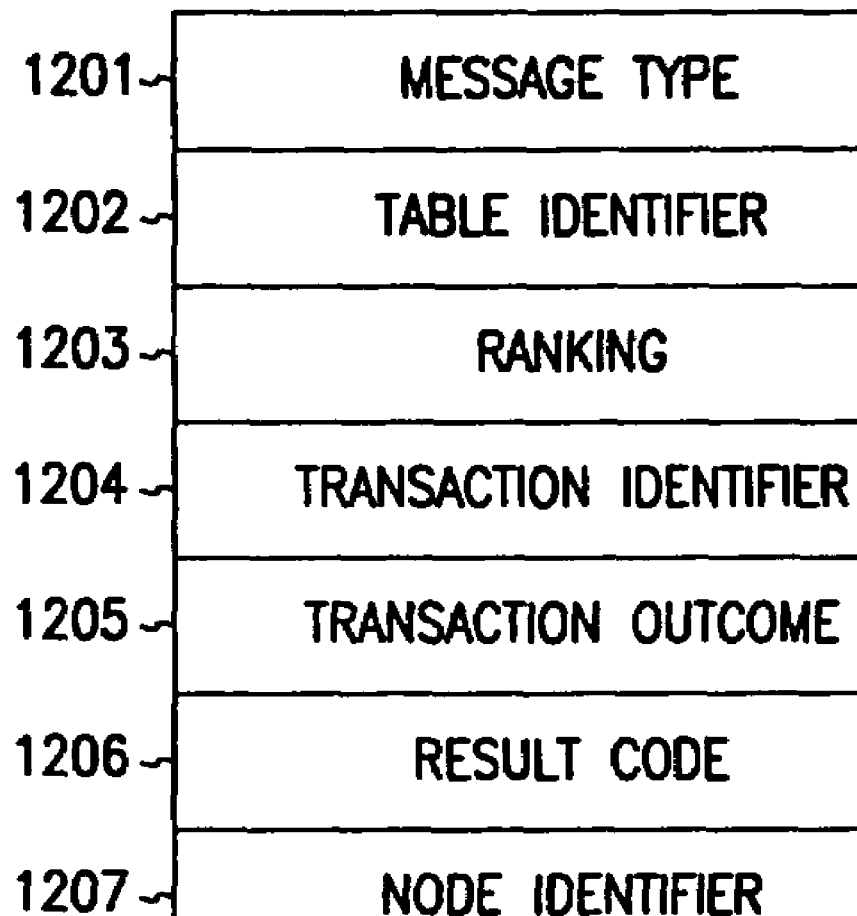
FIG. 12 is a diagram of message data structure for use in an exemplary implementation of the invention.

The messages sent during the synchronization process in the IMDB implementation include GetBestEndpoint, GetBestEndpointResponse, EndOfSnapshotTransaction, EndOfSnapshot, EndOfSnapshotResponse, InitiateRemoteTransaction, InitiateRemoteTransactionResponse, EndOfSynchronization, EndOfSynchronizationResponse, NodeCachingTable and NodeCachingTableResponse. Each message is identified by a message type 1201 and can contain additional fields depending on the message type as shown in FIG. 12.

The GetBestEndpoint message is multicast to all nodes participating in the coherent cache and each node is expected to respond with a GetBestEndpointResponse message that includes a ranking indicating whether the node can act as a source for the table and how busy it is. The GetBestEndpoint message contains the object identifier 1202 of the table being requested. The GetBestEndpointResponse contains the object identifier 1202 of the table and the ranking 1203 of the node.

The ranking in GetBestEndpointResponse is based on the state of the table being asked for, the processing power of the node, the number of table synchronizations active on the node at this time, and the number of arbitrations active on the node at this time. The state of the table value, A, is computed as 0 if the table is not on the node, 1 if the table is currently being synchronized but is not fully populated, 2 if the table is being populated from the backend, and 4 if the table is fully populated. The processing power value B, is computed based on the number of processors (CPUs) on the computer and the speed of the processors (MHz). For examine if the computer has four 400 MHz processors the processing power would be 1600.

The number of table synchronizations, C, active on the node at this time, is the sum of the number of tables it is synchronizing (i.e., acting as a synchronization destination) and the number of simultaneous threads that are acting as a synchronization source to supply data to another computer. The number of arbitrations, D, active on the node is a measure of the amount of update activity on the node.

While one skilled in the art will immediately perceive that there are additional factors that could be used in computing the ranking, e.g., the number of active threads, the percentage of CPU usage over a given period of time, the above factors are relatively easy to compute and maintain, and tend to reflect the level of activity in the in memory data base system. One exemplary embodiment computation for the endpoint ranking is $(A*B)/(C+1)-\text{MIN}(D, A* B/((C+1)*2))$.

If uncommitted changes for a transaction are included in the snapshot, then the destination node is informed when that transaction either commits or aborts using an EndOfSnapshotTransaction message. The EndOfSnapshotTransaction message includes the transaction identifier 1204 and the outcome of the transaction 1205.

The source node sends an EndOfSnapshot message to the destination when it has finished sending all the data for the snapshot. The message includes the object identifier 1202 of the table being snapshot. The destination node sends an EndOfSnapshotResponse message back when it has finished processing all the data included in the snapshot.

The source node broadcasts a NodeCachingTable message containing the identifier 1207 for the destination node to the other nodes in the coherent cache to signal that the destination node is caching the table. Each node in the coherent cache responds with a NodeCachingTableResponse message with the identifier for the destination node when it has performed the processing necessary to include the destination node in any future arbitrations it initiates.

The source node sends an InitiateRemoteTransaction message for every transaction that is part of the snapshot that has not completed at the end of the snapshot. The message includes the transaction identifier 1204 of the transaction and the object identifier 1202 of the table being snapshot. The response is a InitiateRemoteTransactionResponse that includes the transaction identifier 1204, object identifier 1202 of the table and a result code 1206. S_OK means that the transaction was successfully hooked up. S_FALSE means that the transaction was already committing or aborting and therefore the source node should wait for the transaction to commit or abort before proceeding.

The source node sends an EndOfSynchronization message after all it has sent an InitiateRemoteTransaction message for all active transactions for a table to inform the destination node that all active transactions have been forwarded. The message includes the object identifier 1202 of the table. The destination node sends an EndOfSynchronizationResponse message when it has sent all the InitiateRemoteTransactionResponse messages to the source. The EndOfSynchronizationResponse message contains the object identifier 1202 of the table.

Processing Marshaled Arbitrations

Marshaled arbitration messages included in the snapshot are processed depending on the arbitration state. All messages marked as "Pre-Arbitration" are added to the beginning of the pre-arbitration queue in the order they occur. All messages marked as "Current Arbitration" are added to the beginning of the pre-arbitration queue in the order they occur. Any message marked as "Current Closure" is added to the pre-arbitration queue after any messages that were marked as "Current Arbitration." All messages marked as "Post Arbitration" are added to a post-arbitration queue, which is empty prior to adding these messages. Any message marked as "Currently Executing" is assigned to a "Currently Executing Non-expedited Proposal" arbitration field in the arbitration object. Any message marked as "Expedited" is assigned to a "Currently Executing Expedited Proposal" arbitration field in the arbitration object.

Data structures, data and message formats in the synchronization stream, and special handling of marshaled arbitrations employed by the coherent cache IMDB system to dynamically synchronize records on a new node has been described. One skilled in the art will immediately discern that other elements can be added to this particular implementation and that such additions are within the scope of the invention.

CONCLUSION

Dynamic synchronization of tables on a newly added node in a network in which the nodes each make changed to the tables has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that although the invention has been described in terms of database tables, such as used in a relational database, the invention is applicable to any type of data structure which is shared among computers and changed by them. The terminology used in this application with respect to an object-oriented environment is meant to include all database and operating system environments. Therefore, it is manifestly intended that this invention be limited only by the following claims and equivalents thereof.

We claim:

1. A network computer system comprising:
   a source node computer comprising:
      a source node processing unit coupled to a network through a system bus;
      a source node system memory coupled to the source node processing unit through a system bus, wherein a table identically shared among computers on the network is cached in the source node system memory;
      a source node computer-readable medium coupled to the source node processing unit through a system bus; and
      a synchronization source process executed from the source node computer-readable medium by the source node processing unit, wherein the synchronization source process causes the source node processing unit to create a synchronization stream from data for the shared table and to transmit the synchronization stream on the network; and
   a destination node computer comprising:
      a destination node processing unit coupled to the network through a system bus;
      a destination node system memory coupled to the destination node processing unit through a system bus;
      a destination node computer-readable medium coupled to the destination node processing unit through a system bus; and
      a synchronization destination process executed from the destination node computer-readable medium by the destination node processing unit, wherein the synchronization destination process causes the destination node processing unit to receive the synchronization stream from the network and to create a copy of the shared table in the destination node system memory, wherein the synchronization destination process creates the copy on the destination node which is identical to the table already shared among computers on the network, the copy including transactions which are committed during the synchronization destination process.

2. The network computer system of claim 1, wherein the synchronization source process further causes the source node processing unit to place a first message on the network, and the synchronization destination process further causes the destination node processing unit to initiate a process associated with the first message and to respond to the first message when the process is complete.

3. The network computer system of claim 2, wherein the synchronization source process further causes the destination node processing unit to place a second message on the network in response to receiving the response to the first message from the destination node computer.

4. The network computer system of claim 2, wherein the synchronization stream is transmitted on a dedicated channel and the messages sent between the synchronization source computer and the destination source computer are transmitted on a normal messaging channel.

5. A method for synchronizing data on a network computer system comprising a source node computer and a destination node computer,
   wherein the source node computer comprises a source node processing unit coupled to a network, a source node system memory coupled to the source node processing unit, and a source node computer-readable medium coupled to the source node processing unit, and
   wherein the destination node computer comprises a destination node processing unit coupled to the network, a destination node system memory coupled to the destination node processing unit, and a destination node computer-readable medium coupled to the destination node processing unit;
   the method comprising:
      caching a table shared among computers on the network in the source node system memory;
      executing a synchronization source process from the source node computer-readable medium, wherein the synchronization source process causes the source node processing unit to create a synchronization stream from data for the shared table and to transmit the synchronization stream on the network; and
      executing a synchronization destination process from the destination node computer-readable medium, wherein the synchronization destination process causes the destination node processing unit to receive the synchronization stream from the network and to create a copy of the shared table in the destination node system memory, wherein the synchronization destination process creates the copy on the destination node which is identical to the table already shared among computers on the network, the copy including transactions which are committed during the synchronization destination process.

6. The method of claim 5, wherein the synchronization source process further causes the source node processing unit to place a first message on the network, and the synchronization destination process further causes the destination node processing unit to initiate a process associated with the first message and to respond to the first message when the process is complete.

7. The method of claim 6, wherein the synchronization source process further causes the destination node processing unit to place a second message on the network in response to receiving the response to the first message from the destination node computer.

8. The method of claim 6, wherein the synchronization stream is transmitted on a dedicated channel and the messages sent between the synchronization source computer and the destination source computer are transmitted on a normal messaging channel.

9. One or more computer-readable media containing instructions which, when executed by one or more computers, cause the computers to execute a method for synchronizing data on a network computer system comprising a source node computer and a destination node computer, wherein the source node computer comprises a source node processing unit coupled to a network, a source node system memory coupled to the source node processing unit, and a source node computer-readable medium coupled to the source node processing unit, and wherein the destination node computer comprises a destination node processing unit coupled to the network, a destination node system memory coupled to the destination node processing unit, and a destination node computer-readable medium coupled to the destination node processing unit;

the method comprising:

caching a table shared among computers on the network in the source node system memory;

executing a synchronization source process from the source node computer-readable medium, wherein the synchronization source process causes the source node processing unit to create a synchronization stream from data for the shared table and to transmit the synchronization stream on the network; and executing a synchronization destination process from the destination node computer-readable medium, wherein the synchronization destination process causes the destination node processing unit to receive the synchronization stream from the network and to create a copy of the shared table in the destination node system memory, wherein the synchronization destination process creates the copy on the destination node which is identical to the table already shared among computers on the network, the copy including transactions which are committed during the synchronization destination process.

10. The computer-readable media of claim 9, wherein the synchronization source process further causes the source node processing unit to place a first message on the network, and the synchronization destination process further causes the destination node processing unit to initiate a process associated with the first message and to respond to the first message when the process is complete.

11. The computer-readable media of claim 10, wherein the synchronization source process further causes the destination node processing unit to place a second message on the network in response to receiving the response to the first message from the destination node computer.

12. The computer-readable media of claim 10, wherein the synchronization stream is transmitted on a dedicated channel and the messages sent between the synchronization source computer and the destination source computer are transmitted on a normal messaging channel.

* * * * *

UNITED STATES PATENT AND TRADEMARK OFFICE
CERTIFICATE OF CORRECTION

| | |
|---|---|
| PATENT NO. | : 7,516,165 B2 |
| APPLICATION NO. | : 10/975932 |
| DATED | : April 7, 2009 |
| INVENTOR(S) | : Brian T. Berkowitz et al. |

It is certified that error appears in the above-identified patent and that said Letters Patent is hereby corrected as shown below:

In column 28, line 47, in Claim 5, delete "computer -readable" and insert -- computer-readable --, therefor.

In column 29, line 35, in Claim 9, delete "computer -readable" and insert -- computer-readable --, therefor.

Signed and Sealed this
Third Day of May, 2011

David J. Kappos
*Director of the United States Patent and Trademark Office*